US012608241B2

(12) United States Patent

Bansal et al.

(10) Patent No.: US 12,608,241 B2

(45) Date of Patent: Apr. 21, 2026

(54) AUTOMATED PROVISIONING OF CLOUD RESOURCES

(71) Applicant: Oracle International Corporation, Redwood Shores, CA (US)

(72) Inventors: Suruchi Bansal, New Delhi (IN); Shruthi Subramanian, Karnataka (IN); N.V. Murali Krishna, West Mambalam (IN); Sanjay Pande, Marco Island, FL (US)

(73) Assignee: Oracle International Corporation, Redwood Shores, CA (US)

( * ) Notice: Subject to any disclaimer, the term of this patent is extended or adjusted under 35 U.S.C. 154(b) by 446 days.

(21) Appl. No.: 18/193,853

(22) Filed: Mar. 31, 2023

(65) Prior Publication Data

US 2024/0220332 A1 Jul. 4, 2024

(30) Foreign Application Priority Data

Dec. 28, 2022 (IN) .............................. 202241076383

(51) Int. Cl.
| | |
|---|---|
| *G06F 9/50* | (2006.01) |
| *G06F 9/445* | (2018.01) |
| *G06F 40/18* | (2020.01) |

(52) U.S. Cl.
CPC ........ *G06F 9/5077* (2013.01); *G06F 9/44505* (2013.01); *G06F 40/18* (2020.01)

(58) Field of Classification Search
CPC .... G06F 9/5077; G06F 9/44505; G06F 40/18; G06F 9/5072; G06F 9/455
See application file for complete search history.

(56) References Cited

U.S. PATENT DOCUMENTS

| | | | |
|---|---|---|---|
| 9,712,454 | B2 | 7/2017 | Tung et al. |
| 10,157,084 | B2 | 12/2018 | Nachtrab et al. |
| 10,713,287 | B1 * | 7/2020 | Rosomoff ............. G06F 16/332 |
| 2009/0276771 | A1 * | 11/2009 | Nickolov ............. H04L 67/1029 |
| | | | 718/1 |
| 2011/0320605 | A1 | 12/2011 | Kramer et al. |

(Continued)

OTHER PUBLICATIONS

Roper, "Converting information from a spreadsheet into Terraform formatted variable files . . . part 1," Faun publication, 5 pages, Aug. 11, 2020.

(Continued)

*Primary Examiner* — Dong U Kim

(74) *Attorney, Agent, or Firm* — Potomac Law Group, PLLC

(57) ABSTRACT

Embodiments provision cloud infrastructure services comprising a plurality of components for a first cloud infrastructure. Embodiments receive a selection of a first service of the cloud infrastructure services, the first service comprising a plurality of first components. Embodiments, via an application programming interface corresponding to the cloud infrastructure, extract information for each of the plurality of first components. Embodiments create a spreadsheet corresponding to the first service, the spreadsheet comprising a spreadsheet tab corresponding to each of the first components, and populate the spreadsheet tabs with the extracted information.

20 Claims, 18 Drawing Sheets

(56) References Cited

U.S. PATENT DOCUMENTS

| 2015/0082016 A1* | 3/2015 | Bonczkowski | ..... G06F 9/44505 |
| | | | 713/100 |
| 2019/0311066 A1* | 10/2019 | Pal | ...................... G06F 16/9536 |
| 2022/0067272 A1* | 3/2022 | Ripa | ..................... G06F 3/0482 |
| 2023/0037199 A1* | 2/2023 | Holzman | ............ H04L 41/0843 |

OTHER PUBLICATIONS

Roper, "Converting information from a spreadsheet into Terraform formatted variable files . . . part 2," Faun publication, 5 pages, Aug. 13, 2020.
Unknown "Is there a way to input variable values from outside to terraform main file?," stackoveflow.com, 2 pages, Jan. 10, 2023.
Unknown "Automate Infrastructure on Any Cloud," www.terraform. io, 4 pages.
Unknown "AWS CloudFormation Features" aws.amazon.com, 5 pages, Jan. 10, 2023.
Unknown "AWS CloudFormation," aws.amazon.com/cloudformation, 1 page.
Unknown "Config Provider," registry.terraform.io, 2 pages, Jan. 10, 2023.
Unknown "Config Workbook (Data Source)," registry.terraform.io, 10 pages, Jan. 10, 2023.
Unknown "Conul-terraform-sync part-1 introduction," nicovibert. com, 4 p. 2021.
Unknown "Creating Resource types," docs.aws.amazon.com, 2 pages, Jan. 10, 2023.
Unknown "Data Sources," developer.hashicop.com.terraform. language, 7 pages, Jan. 10, 2023.
Unknown "Excel to Terraform Converter," GitHub.compublication, 2 pages, Jan. 10, 2023.
Unknown "Provider Configuration," developer.hashicop.com. terraform.language, 5 pages, Jan. 10, 2023.
Unknown "Provisioning IPO CC Spreadsheet," avaya.com, 2 pages, May 15, 2018.
Unknown "vpn connection," terraform-aws-vpn-connection, 16 pages, Jan. 11, 2023.
Unknown, "A graphical tool for cloud-based building energy simulation," www.researchgate.net, 9 pages, Jan. 2014.

* cited by examiner

GreenField Workflow - Create Network

Hub and Spoke Network Topology in OCI

| A | B | C | D | E | F | G | H | I | J |
|---|---|---|---|---|---|---|---|---|---|
| Region | Compartment Name | VCN Name | CIDR Blocks | DRG Required | IGW Required | NGW Required | SGW Required | LPG Required | Hub/Spoke/Peer/None |
| Ashburn | Network | VCN-H | 10.0.0.0/16 | DRG | n | y | n | LPG-H-1,LPG-H-2 | Hub |
| Ashburn | Network | VCN-1 | 192.167.0.0/16 | n | n | n | y | LPG-1 | Spoke:VCN-H |
| Ashburn | Network | VCN-2 | 192.168.0.0/16 | n | n | n | y | LPG-2 | Spoke:VCN-H |
| <END> | | | | | | | | | |

FIG. 9A

| C | D | E | F | G | H | I | J | K | L | M | N | O | P |
|---|---|---|---|---|---|---|---|---|---|---|---|---|---|
| VCN Name | Subnet Name | CIDR Block | Availability Domain (AD1\|AD2\|AD3\|Regional) | Type (private\|public) | DHCP Option Name | Route Table Name | Seclist Names | Add Default Seclist | Configure SGW Route (n\|object_storage\|all_services) | Configure NGW Route (y\|n) | Configure IGW Route (y\|n) | Configure OnPrem Route (y\|n) | Configure VCN Peering Route (y\|n) |
| VCN-H | Subnet-H | 10.1.0.0/24 | Regional | private | dhcp-internal | Subnet-H-RT | Subnet-H-SL | n | n | y | n | y | y |
| VCN-1 | Subnet-1 | 192.167.1.0/24 | Regional | public | dhcp-internal | Subnet-1-RT | Subnet-1-SL | n | object_storage | n | ▼ | y | y |
| VCN-2 | Subnet-2 | 192.168.1.0/24 | Regional | private | dhcp-internal | Subnet-2-RT | Subnet-2-SL | n | object_storage | y | n | y | y |

FIG. 9B

| C VCN Name | D Subnet Name | E CIDR Block | F Availability Domain (AD1|AD2|AD3|Regional) | G Type (private|public) | H DHCP Option Name | I Route Table Name | J Seclist Names | K Add Default Seclist | L Configure SGW Route (n|object_storage|all_services) | M Configure NGW Route (y|n) | N Configure IGW Route (y|n) | O Configure OnPrem Route (y|n) | P Configure VCN Peering Route (y|n) |
|---|---|---|---|---|---|---|---|---|---|---|---|---|---|
| VCN-H | Subnet-H | 10.1.0.0/24 | Regional | private | dhcp-internal | Subnet-H-RT | Subnet-H-SL | n | n | y | n | y | y |
| VCN-1 | Subnet-1 | 192.167.1.0/24 | Regional | public | dhcp-internal | Subnet-1-RT | Subnet-1-SL | n | object_storage | n | ▾ | y | y |
| VCN-2 | Subnet-2 | 192.168.1.0/24 | Regional | private | dhcp-internal | Subnet-2-RT | Subnet-2-SL | n | object_storage | y | n | y | y |

FIG. 10

DRGv2 Network Topology in OCI

| | A | B | C | D | E | F | G | H | I | J |
|---|---|---|---|---|---|---|---|---|---|---|
| | Region Name | Compartment Name | VCN Name | CIDR Blocks | DRG Required | IGW Required | NGW Required | SGW Required | LPG Required | Hub/Spoke/Peer/None |
| | Ashburn | Network | VCN-H | 10.0.0.0/16 | DRGv2 | n | n | n | n | None |
| | Ashburn | Network | VCN-1 | 192.167.0.0/16 | DRGv2 | n | n | y | n | None |
| | Ashburn | Network | VCN-2 | 192.168.0.0/16 | DRGv2 | n | n | y | n | None |
| | <END> | | | | | | | | | |

FIG. 12A

| C | D | E | F | G | H | I | J | K | L | M | N | O | P |
|---|---|---|---|---|---|---|---|---|---|---|---|---|---|
| VCN Name | Subnet Name | CIDR Block | Availability Domain (AD1|AD2|AD3|Regional) | Type (private|public) | DHCP Option (private|public) Name | Route Table Name | Seclist Names | Add Default Seclist | Configure SGW Route (n|object_storage|all_services) | Configure NGW Route (y|n) | Configure IGW Route (y|n) | Configure OnPrem Route (y|n) | Configure VCN Peering Route (y|n) |
| VCN-H | Subnet-H | 10.1.0.0/24 | Regional | private | dhcp-internal | Subnet-H-RT | Subnet-H-SL | n | n | y | n | y | y |
| VCN-1 | Subnet-1 | 192.167.1.0/24 | Regional | public | dhcp-internal | Subnet-1-RT | Subnet-1-SL | n | object_storage | n | ▼ | y | y |
| VCN-2 | Subnet-2 | 192.168.1.0/24 | Regional | private | dhcp-internal | Subnet-2-RT | Subnet-2-SL | n | object_storage | y | n | y | y |

FIG. 12B

Properties used during Networking Objects Creation
"onprem_destinations" - represents On Prem CIDRs for DRG routing; should not be left empty.
"ngw_destination" - represents destination CIDRs for NAT Gatway; accepts comma seperated list; defaults to 0.0.0.0/0 if left empty.
"igw_destination" - represents destination CIDRs for Internet Gatway; accepts comma seperated list; defaults to 0.0.0.0/0 if left empty.

| Property | Value |
|---|---|
| onprem_destinations | 172.16.0.0/12 |
| ngw_destination | 0.0.0.0/0 |
| igw_destination | 0.0.0.0/0 |

FIG. 12C

| Region | Compartment Name | DRG Name | Attached To Name | DRG RT Name | Import DRG Route Distribution Name | Import DRG Route Distribution Statements |
|---|---|---|---|---|---|---|
| Ashburn | Network | DRGv2 | VCN::VCN-H | VCN-H-RT | import-vcn-routes | DRG_ATTACHMENT_TYPE::VCN::1 |
| Ashburn | Network | DRGv2 | VCN::VCN-1 | VCN-1-RT | import-vcn-routes | DRG_ATTACHMENT_TYPE::VCN::1 |
| Ashburn | Network | DRGv2 | VCN::VCN-2 | VCN-2-RT | import-vcn-routes | DRG_ATTACHMENT_TYPE::VCN::1 |

FIG. 13A

| C | D | E | F | G | H | I | J | K | L | M | N | O | P |
|---|---|---|---|---|---|---|---|---|---|---|---|---|---|
| VCN Name | Subnet Name | CIDR Block | Availability Domain (AD1\|AD2\|AD3\| Regional) | Type (private\|public) | DHCP Option Name | Route Table Name | Seclist Names | Add Default Seclist | Configure SGW Route (n\|object storage\| all_services) | Configure NGW Route (y\|n) | Configure IGW Route (y\|n) | Configure OnPrem Route (y\|n) | Configure VCN Peering Route (y\|n) |
| VCN-H | Subnet-H | 10.1.0.0/24 | Regional | private | dhcp-internal | Subnet-H-RT | Subnet-H-SL | n | n | y | n | y | y |
| VCN-1 | Subnet-1 | 192.167.1.0/24 | Regional | public | dhcp-internal | Subnet-1-RT | Subnet-1-SL | n | object_storage | n | [▼] | y | y |
| VCN-2 | Subnet-2 | 192.168.1.0/24 | Regional | private | dhcp-internal | Subnet-2-RT | Subnet-2-SL | n | object_storage | y | n | y | y |

FIG. 13B

Properties used during Networking Objects Creation

"onprem_destinations" - represents On Prem CIDRs for DRG routing; should not be left empty.

"ngw_destination" - represents destination CIDRs for NAT Gatway; accepts comma seperated list; defaults to 0.0.0.0/0 if left empty.

"igw_destination" - represents destination CIDRs for Internet Gatway; accepts comma seperated list; defaults to 0.0.0.0/0 if left empty.

| Property | Value |
|---|---|
| onprem_destinations | 172.16.0.0/12 |
| ngw_destination | 0.0.0.0/0 |
| igw_destination | 0.0.0.0/0 |

FIG. 13C

NonGreenField Workflow - Export Network

AUTOMATED PROVISIONING OF CLOUD RESOURCES

FIELD

One embodiment is directed generally to a computer system, and in particular to provisioning of cloud resources using a computer system.

BACKGROUND INFORMATION

Cloud service providers provide various services in the "cloud", meaning over a network, such as the public Internet, that are remotely accessible to any network-connected client device. Examples of the services models used by cloud service providers (also referred to herein as "cloud providers" or "providers") include infrastructure as a service ("IaaS"), platform as a service ("PaaS"), software as a service ("SaaS"), and network as a service ("NaaS"). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to a customer on a subscription basis, and is centrally hosted by the cloud provider. Under this model, applications can be accessed, for example, using a web browser. NaaS providers provide network services to customers, for example, by provisioning a virtual network on the network infrastructure operated by another party. In each of these service models, the cloud service provider maintains and manages the hardware and/or software that provide the services, and little, if any, software executes on a user's device.

Customers of cloud service providers, which are also referred to herein as users and tenants, can subscribe to the service provider to obtain access to the particular services provided by the service provider. The service provider can maintain an account for a user or tenant through which the user and/or tenant can access the provider's services. The service provider can further maintain user accounts that are associated with the tenant, for individual users. Further, some cloud systems/infrastructure allow the customer to provision cloud resources for their use. Provisioning cloud resources involves creating and configuring computing infrastructure, storage, networking, and other resources needed to run applications or services in a cloud environment.

SUMMARY

Embodiments provision cloud infrastructure services comprising a plurality of components for a first cloud infrastructure. Embodiments receive a selection of a first service of the cloud infrastructure services, the first service comprising a plurality of first components. Embodiments, via an application programming interface corresponding to the cloud infrastructure, extract information for each of the plurality of first components. Embodiments create a spreadsheet corresponding to the first service, the spreadsheet comprising a spreadsheet tab corresponding to each of the first components, and populate the spreadsheet tabs with the extracted information.

BRIEF DESCRIPTION OF THE DRAWINGS

Further embodiments, details, advantages, and modifications will become apparent from the following detailed description of the embodiments, which is to be taken in conjunction with the accompanying drawings.

FIGS. 9A-9C illustrate several example tabs of a spreadsheet that can be used as input to the system in accordance to embodiments.

FIG. 10 illustrate an example tab of a spreadsheet that can be used as input to the system in accordance to embodiments.

FIGS. 12A-12C illustrate several example tabs of a spreadsheet that can be used as input to the system in accordance to embodiments.

FIGS. 13A-13C illustrate several example tabs of a spreadsheet that can be used as input to the system in accordance to embodiments.

DETAILED DESCRIPTION

Embodiment automate the provisioning of cloud resources on a cloud infrastructure by accepting a spreadsheet file (e.g., an excel file) or other human readable and editable type of file, and automatically use that data to provision resources. Embodiments further can create a spreadsheet file based on already deployed cloud resources, enabling a user to edit the spreadsheet file to revise the provisioned resources, or automatically provision the cloud resources using the spreadsheet file on a different cloud infrastructure (i.e., a cloud infrastructure from a different cloud infrastructure provider).

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
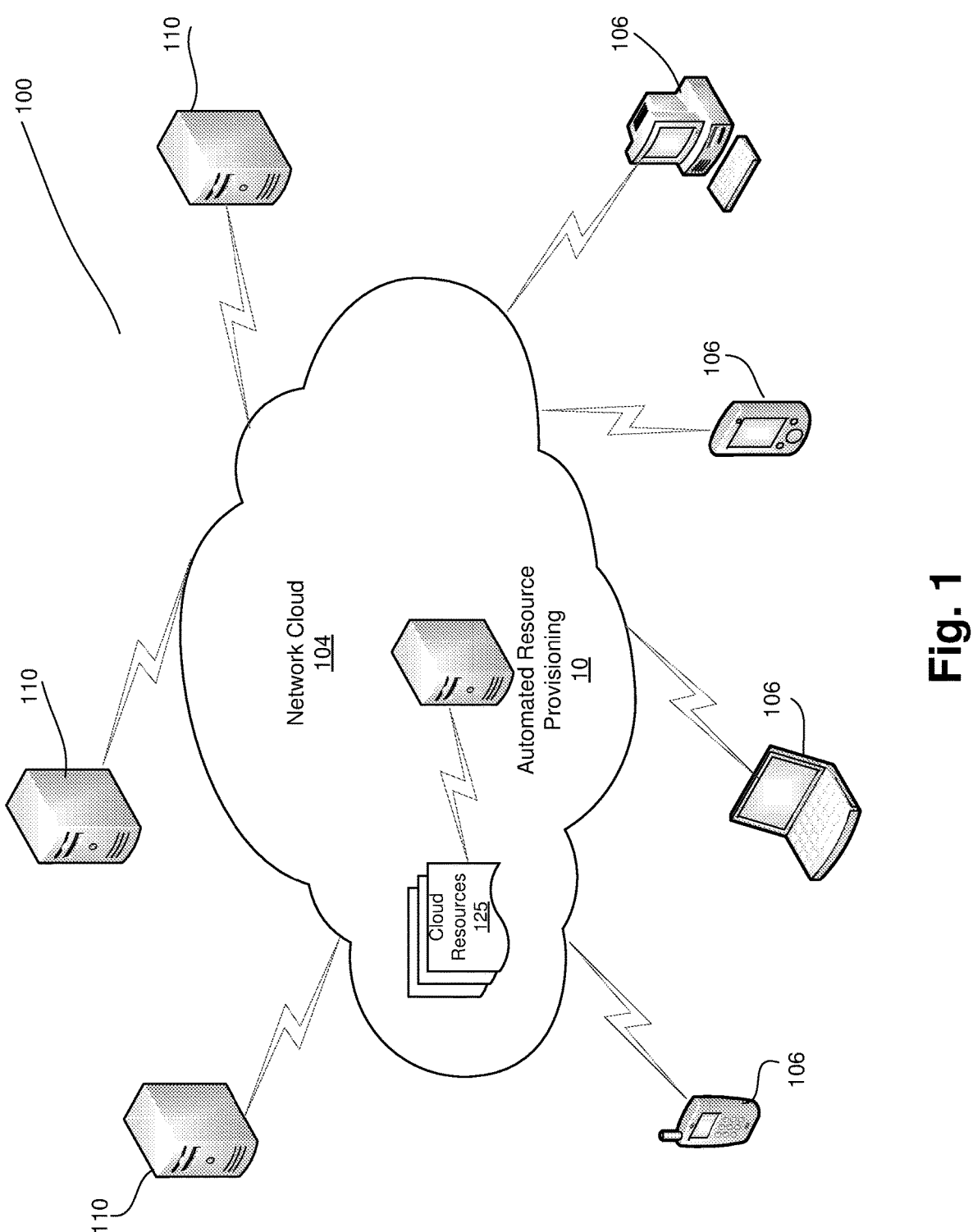
FIG. 1 illustrates an example of a system that includes an automated resource provisioning system in accordance to embodiments.

FIG. 1 illustrates an example of a system 100 that includes an automated resource provisioning system 10 in accordance to embodiments. Automated resource provisioning system 10 may be implemented within a computing environment that includes a communication network/cloud 104. Network 104 may be a private network that can communicate with a public network (e.g., the Internet) to access additional services 110 provided by a cloud services provider (i.e., a cloud infrastructure). Examples of communication networks include a mobile network, a wireless network, a cellular network, a local area network ("LAN"), a wide area network ("WAN"), other wireless communication networks, or combinations of these and other networks. Automated provisioning system 10 may be administered by a service provider, such as via the Oracle Cloud Infrastructure ("OCI") from Oracle Corp.

Tenants of the cloud services provider can be organizations or groups whose members include users of services offered by service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 106, which can be any type of device that can access network 104 and can obtain the benefits of the functionality of automated resource provisioning system 10 of the automated resource provisioning of cloud resources. As disclosed herein, a "client" (also disclosed as a "client system" or a "client device") may be a device or an application executing on a device. System 100 includes a number of different types of client devices 106 that each is able to communicate with network 104.

Cloud 104 includes a plurality of cloud resources 125 that need to be provisioned on a per customer or per tenant basis. Resources 125 can include processors, memory, virtual machines, communication channels, etc. Automated resource provisioning system 10, in general, automates the provisioning of these resources.

Figure 2:
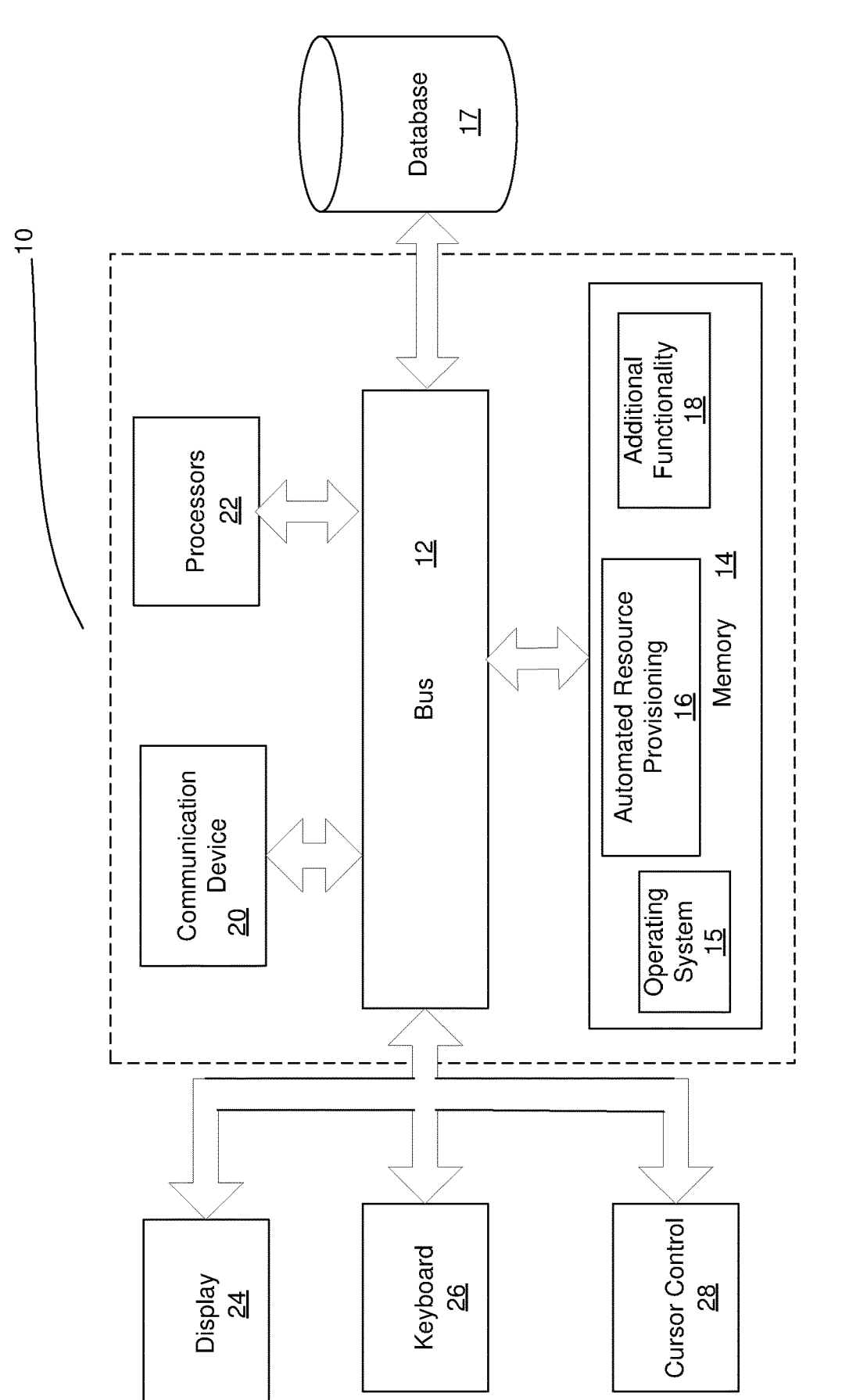
FIG. 2 is a block diagram of the automated resource provisioning system of FIG. 1 in the form of a computer server/system in accordance with an embodiment of the present invention.

FIG. 2 is a block diagram of automated resource provisioning system 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. One or more components of FIG. 2 can also be used to implement any of the elements of FIG. 1 and FIGS. 3-6, discussed below.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an automated resource provisioning module 16 that provides automates cloud resource provisioning, and all other functionality disclosed herein. System 10 can be part of a larger system. Therefore, system 10 can include one or more additional functional modules 18 to include the additional functionality, such as any other functionality provided by the Oracle Cloud Infrastructure ("OCI") from Oracle Corp. or other cloud infrastructure system such as "AWS" from Amazon Corp. A file storage device or database 17 is coupled to bus 12 to provide centralized storage for modules 16 and 18, including data regarding previous schema mappings. In one embodiment, database 17 is a relational database management system ("RDBMS") that can use Structured Query Language ("SQL") to manage the stored data.

The process of provisioning cloud resources typically involves the following steps:

1. Determine resource requirements: Identify the computing, storage, and networking resources needed to run the application or service in the cloud.
2. Select a cloud provider: Choose a cloud provider that can provide the required resources, such as Amazon Web Services ("AWS"), Oracle Cloud Infrastructure ("OCI") Microsoft Azure, or Google Cloud Platform ("GCP").
3. Choose a deployment model: Select a deployment model that best fits the application's needs, such as Infrastructure as a Service (IaaS), Platform as a Service (PaaS), or Software as a Service (SaaS).
4. Configure resources: Configure the resources, including virtual machines, containers, storage, and networking components, based on the application's requirements.

5. Provision resources: Provision the resources by setting up the infrastructure and deploying the application to the cloud.

6. Monitor and manage resources: Continuously monitor the resources to ensure they are performing as expected, and manage them as needed to optimize performance, availability, and cost.

7. Scale resources: Scale the resources up or down as needed to meet changes in demand, such as increasing the number of virtual machines or adding storage capacity.

Overall, provisioning cloud resources requires careful planning, configuration, and management to ensure optimal performance, security, and cost-effectiveness. One known tool that is available to automate the provisioning of resources is "Terraform", which is an open source infrastructure as code ("IaC") tool that allows users to provision, manage, and automate cloud resources across multiple cloud platforms using a declarative language. Terraform uses a simple configuration file to define the desired state of the infrastructure, and then it applies that configuration to provision and manage the resources in a consistent and repeatable way. Embodiments work in conjunction with Terraform or other IaC tools to further automate the resource provisioning.

Figure 3:
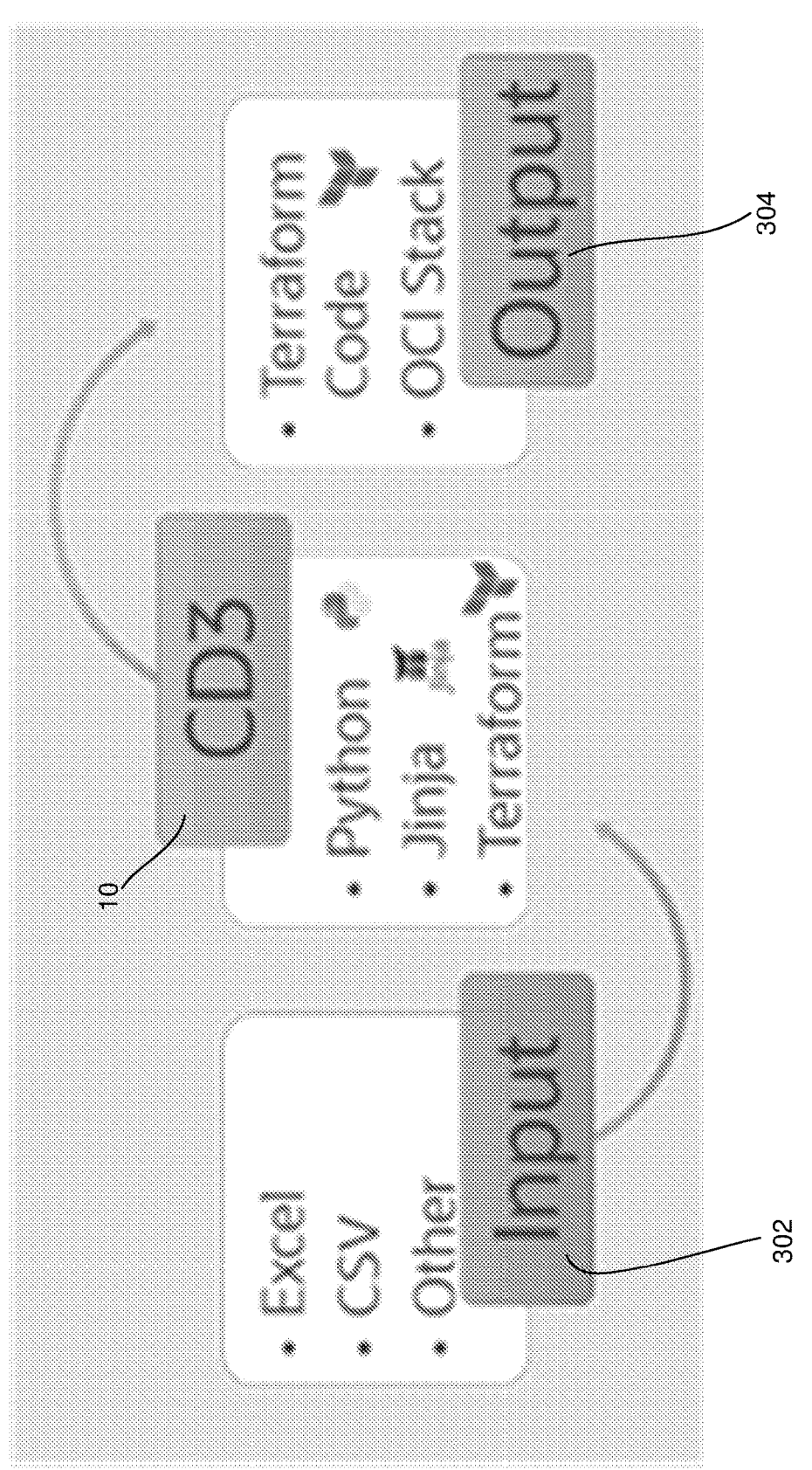
FIG. 3 is a block diagram of the automated resource provisioning system of FIG. 1 in accordance to embodiments.

FIG. 3 is a block diagram of automated resource provisioning system 10 of FIG. 1 in accordance to embodiments. Automated resource provisioning system 10 is also referred to as Cloud Deployment Design Deliverable ("CD3") in FIG. 3 and in some subsequent figures. Further, although the subsequent figures and corresponding text, in general, disclose an embodiment that is implemented for OCI, other embodiments can be used for other cloud infrastructure providers.

As shown in FIG. 3, automated resource provisioning system 10 receives as input 302 an Excel spreadsheet file from Microsoft Corp., a comma-separated values ("CSV") file, or any other type of human editable/readable file. Input 302 is a detailed cloud infrastructure design specification. System 10 converts input 302 into executable Terraform code output 304, or takes an export of OCI tenancy objects and resources, and converts it back into a design specification (i.e., the reverse procedure).

Figure 4:
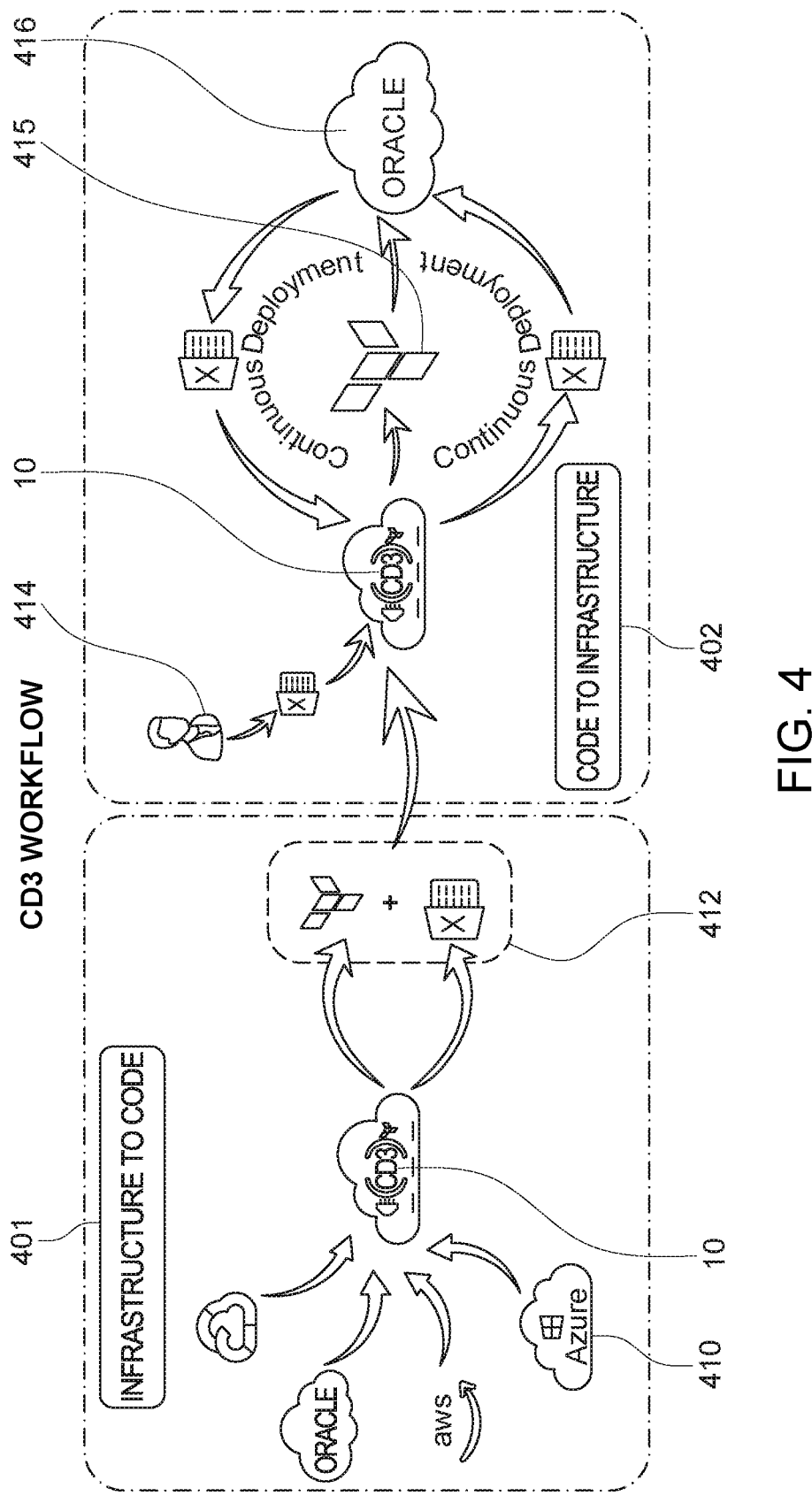
FIG. 4 is an overview of the two workflows of the automated resource provisioning system of FIG. 1 in accordance to embodiments.

FIG. 4 is an overview of the two workflows of automated resource provisioning system 10 of FIG. 1 in accordance to embodiments. In the infrastructure to code workflow at 401, cloud infrastructure with already provisioned resources at 410 are transformed to human readable files at 412 (e.g., an excel spreadsheet) that reflect the provisioned resources. In the cloud to infrastructure workflow at 402, input human readable files at 416 (e.g., an excel spreadsheet) are transformed into Terraform code at 415 which is used to provision cloud resources at 416.

Embodiments include a dynamic tenancy generator, which is a toolkit that helps to build OCI tenancies with minimal to large infrastructure setups across different regions. This makes the toolkit operationally very efficient.

Embodiments further include a cloud infra lifecycle orchestrator that discovers existing tenancies easily and creates infrastructure configuration as Terraform code. The orchestrator can be used to replicate workloads in different tenancies and can be used to migrate workloads from one cloud infrastructure to another (e.g., AWS to OCI).

Embodiments provide a declarative approach, with a focus on secure design. Users can focus on the future state secure design of the tenancy. The toolkit in embodiments also offer Center for Internet Security ("CIS") compliant templates which can be used to build a secure tenancy and can run an CIS compliance checker. Embodiments eliminate translation errors from Design to Build and deploy and minimize coding efforts.

The toolkit in embodiments evaluates an excel design specification and creates the appropriate Terraform modules including making intelligent decisions around routing and security rules. For example, the toolkit adds required rules for Inter virtual cloud network ("VCN", i.e., a software defined or virtual network) connectivity either via VCN Peering or dynamic routing gateway ("DRGv2") based on data in CD3. Embodiments also have a CD3 Validator which is smart enough to check the input data before creating terraform files for it, and also supports any new attributes introduced for OCI resources dynamically.

In embodiments, the output terraform files 415 delivered by system 10 are in consistent Enterprise Grade Modular format which can be delivered and integrated with a customer's continuous integration and continuous deployment ("CI/CD"). The modules are decoupled by design and easily pluggable into any existing terraform environments. Embodiments implement best practices for terraform modules and generate multiple composable building-block modules and assemble them together to produce an easily manageable large eco-system in OCI.

In addition, embodiments allow the end user to customize the grouping of generated terraform files by resource type and is available for both Greenfield and Non-Greenfield workflows disclosed below. This allows the separate management of the differently grouped resources by separate teams. For example, all the network components can be independently managed by a separate team from the compute components, which are generally managed by a different team in most cloud infrastructures.

Embodiments provide a unified solution and help manage OCI tenancies holistically for the complete CRUD life cycle operations, in contrast to known spreadsheet to terraform converters that merely create terraform files just once. Specifically, known converters do not take into account any existing infra/tfvars and will overwrite the existing data if executed multiple times. In contrast, embodiments generate only differential data when the "Modify Network" option is executed and will not change existing infra. Table 1 below describes OCI services supported by embodiments of system 10 that are implemented for OCI, and corresponding components/resources for the cloud service. Similar services for other cloud infrastructure (and corresponding components) in other embodiments can similarly be supported.

TABLE 1

| Cloud Infrastructure Services | Components |
| --- | --- |
| IAM/Identity | Compartments, Groups, Dynamic Groups, Policies |
| | FSS |
| | Block and Boot Volumes |
| | Backup Policies |
| | Exadata Infra, ExaCS, DB Systems VM and BM |

TABLE 1-continued

| Cloud Infrastructure Services | Components |
|---|---|
| | ADB |
| Network | VCNs, Subnets, Internet Gateways, NAT Gateways, Dynamic Routing Gateways, DHCP, Service Gateways, Local Peering Gateways, Route Tables, Security Lists, DRG Route Tables, DRG Route Distribution Statements, NSGs and VCN Flow Logs |
| | LBaaS |
| | Network Load Balancers |
| Governance | Tags (Namespaces, Tag Keys, Defined Tags, Default Tags, Cost Tracking) |
| Compute | Instances, Dedicated VM Hosts |
| Storage | FSS |
| | Block and Boot Volumes |
| | Backup Policies |
| Database | Exadata Infra, ExaCS, DB Systems VM and BM |
| | ADB |
| Management Services | Events, Notifications, Alarms |
| Developer Services | Resource Manager |
| Other Services | VCN Flow Logs, Cloud Guard, Object Storage, Key Vault, Budget |

Embodiments can help reverse engineer the cloud infrastructure in an existing cloud tenancy into a Design Document (e.g., Excel sheet) and build new tenancies using the same. Since an excel sheet or other spreadsheet in embodiments is used to deploy resources, it can be leveraged as a repository that acts as a centralized view for all the deployed OCI resources. Embodiments can further upload the managed terraform stack to the OCI resource manager at any given point in time and let the customers manage it.

As disclosed, embodiments support two different workflows (referred to as "GreenField" and "Non-GreenField" workflows). The workflows in embodiments are based on the input parameter "non_gf_tenancy" in the setUpOCI.properties file.

Figure 5:
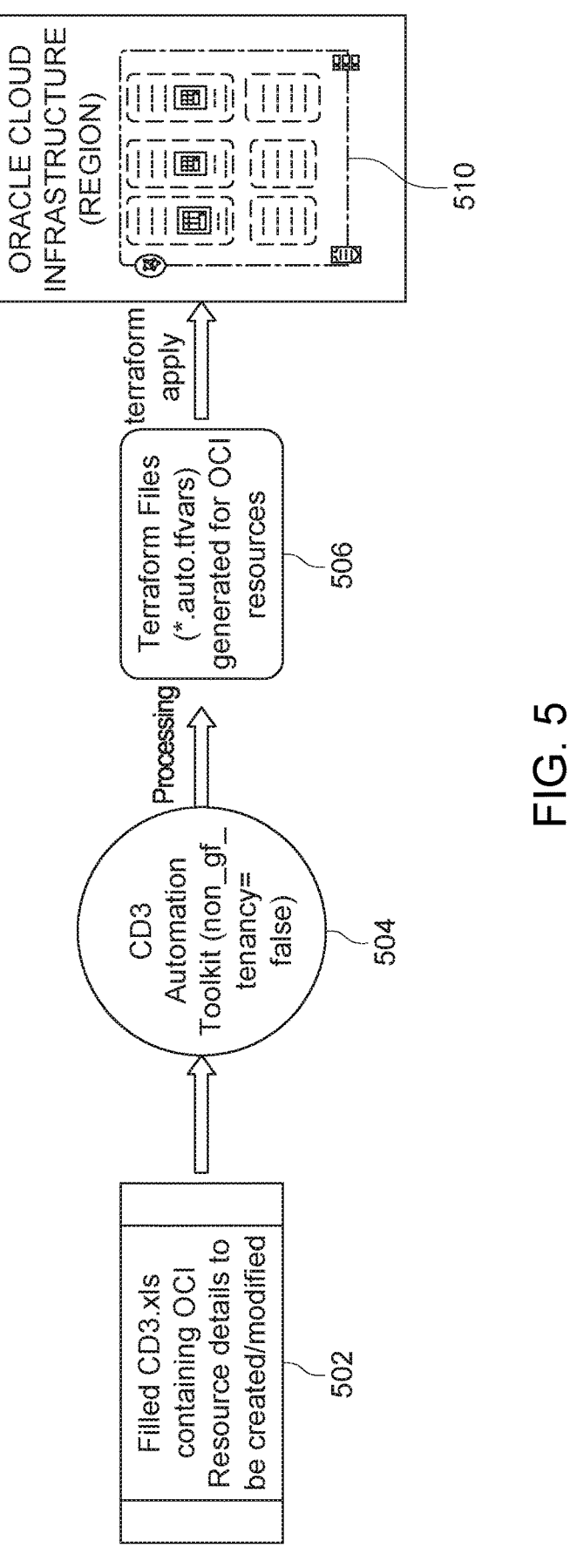
FIG. 5 is a block diagram of the GreenField workflow that starts with a spreadsheet file and ends with terraform code to provision cloud resources in accordance to embodiments.

FIG. 5 is a block diagram of the GreenField workflow that starts with a spreadsheet file and ends with terraform code to provision cloud resources in accordance to embodiments.

Input files 502 are received by toolkit 504, which displays a menu to choose which OCI resources need to be created. Based on the option chosen, it reads the specific tabs from the input excel sheet 502 and creates the terraform files 506 that are used to provision resources on cloud infrastructure 510. The output terraform files 506 can be consumed by the customer and included in their CI/CD pipeline (i.e., a series of steps that must be performed in order to deliver a new version of software).

Figure 6:
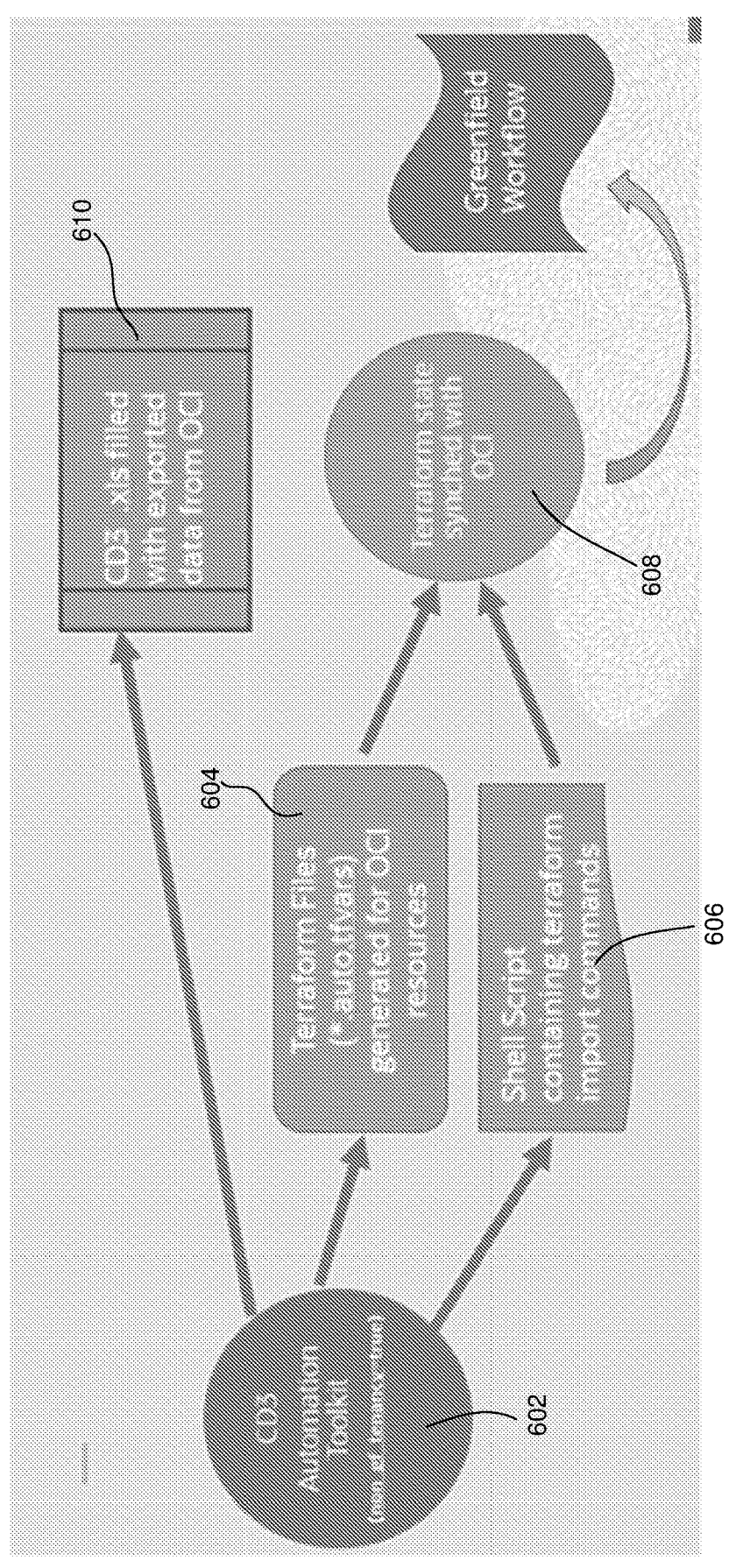
FIG. 6 is a block diagram of the Non-GreenField workflow that starts with provisioned cloud resources and ends with a spreadsheet file in accordance to embodiments.

FIG. 6 is a block diagram of the Non-GreenField workflow that starts with provisioned cloud resources and ends with a spreadsheet file in accordance to embodiments. The toolkit/system 602 displays a menu to choose the OCI resources to be exported from the tenancy. Based on the options chosen, it extracts the data from OCI and fills the specific tab of the excel sheet 610. The excel sheet 610 contains individual tabs for each resource (e.g., the data exported in connection with Virtual Cloud Networks will go into the "VCNs" tab). Toolkit 602 then reads the tabs and generates the terraform files 604 for the exported resource. It also creates a shell script 606 with terraform import commands to create the tfstate file (i.e., terraform state file) for the exported resources. Once the export is complete, and the tfstate is synchronized with OCI at 608, the exported OCI resources can be managed using terraform. The terraform state file is held in the same directory where Terraform is run. It is created after running terraform apply. The actual content of the tfstate file is a JavaScript Object Notation ("JSON") formatted mapping of the resources defined in the configuration and those that exist in the infrastructure.

In embodiments, for both GreenField and Non-GreenField workflows, spreadsheet tabs can exist for any or all of the corresponding components for each of the cloud infrastructure services shown in Table 1 above. Therefore, for example, IAM/identity tabs can include Compartments, Groups, Policies, etc. The disclosure below generally describes Network components for which a tab can exist for each (e.g., VCN, DRG, VCN Info., etc.). However, any of the services of Table 1 can be represented.

Referring to the GreenField workflow of FIG. 5, and embodiments that provision resources on the OCI, system 10, implemented by toolkit 504, helps with end to end administration of the network in the tenancy. It supports multiple Network Topologies with minimal inputs in the CD3 excel sheet 502.

For a Local Peering Gateways ("LPG") based architecture, toolkit 504 will automatically create the LPGs and peer them, attach the route table and create the appropriate routing rules to enable connectivity between these peers. An LPG is a component on a VCN for routing traffic to a locally peered VCN. As part of configuring the VCNs, each administrator must create an LPG for their VCN. A given VCN must have a separate LPG for each local peering it establishes For a DRG or DRGv2 based architecture, toolkit 504 will enable the connectivity between the VCNs and the VCN and DRG, which will allow the on-premises connection or other DRG connections as well. A DRG is a virtual router that provides a path for private network traffic between networks. It can be used with other Networking Service components to create a connection to an on-premises network using Site-to-Site VPN or a connection that uses FastConnect.

For both architectures, route rules are also calculated based on the VCNs, Subnets and the appropriate "on_prem_destination", Public subnet Internet access via "igw_destination" and private subnet internet access via the "ngw_destination" parameters, without user intervention and added to the appropriate route tables of the VCN Subnet Route Table and the DRG Route Table. A subnet, in general, is a logical subdivision of an IP Network defined using the VCN. The practice of dividing a network into two or more networks is called subnetting.

Figure 7:
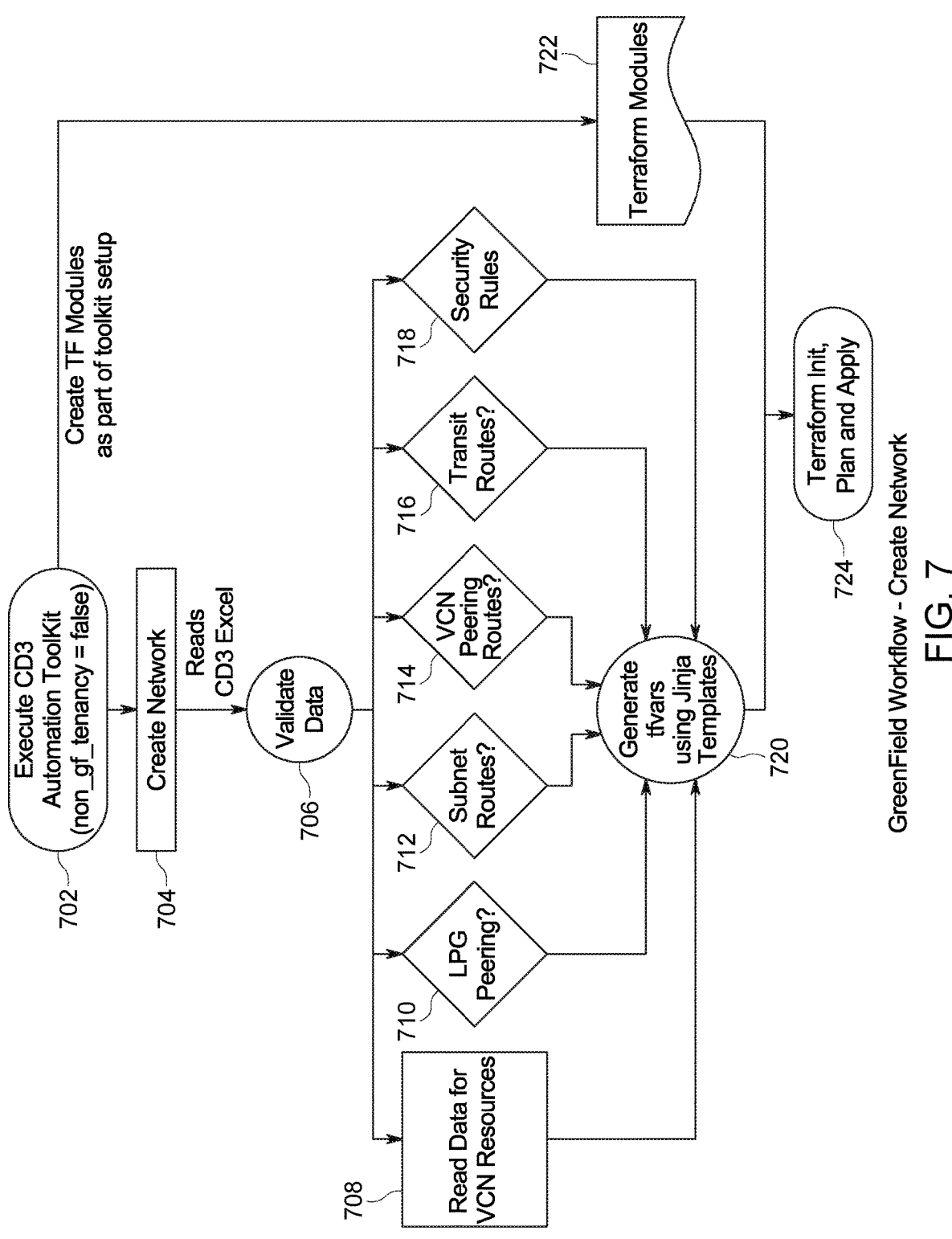
FIG. 7 is a flow diagram of the functionality of the automated resource provisioning module of FIG. 2 when provisioning cloud resources in accordance to one embodiment.

FIG. 7 is a flow diagram of the functionality of automated resource provisioning module 16 of FIG. 2 when provisioning cloud resources in accordance to one embodiment. FIG. 7 provides details on the Greenfield workflow shown in FIG. 5 for provisioning an OCI. In one embodiment, the functionality of the flow diagram of FIG. 7 (and FIG. 14 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The functionality of FIG. 7 begins at 702 using as input to toolkit 504 excel spreadsheet 502 and at 704 the "Create Network" option is chosen. A more detailed disclosure of the Create Network workflow for the Hub & Spoke (shown in FIG. 8) vs. the DRGv2 Network Topology (shown in FIG. 11) is disclosed below.

At 706, the toolkit validates the data in the excel sheet. Validations performed include checking for typos, conflicts between Classless Inter-Domain Routing ("CIDR") blocks, invalid route combinations, etc.

At 708, the toolkit reads data for VCN Resources such as VCNs, DRGs, Subnets, DHCP, VCN attachments etc. and creates the Terraform "tfvars" for them. tfvars files are used to define variables, also known as variable definition files while .tf files are used to declare variables. The variable declaration refers to the process of declaring an intention to create an object but does not hold a value.

At 710, the toolkit makes decisions to establish LPG Peering based on Hub/Spoke/Peer/None data in the excel spreadsheet.

At 712, the toolkit makes decisions to establish Subnet Routes for internet communication via the Internet Gateway for public subnets and the NAT Gateway for private subnets based on y/n in the Subnets tab and also for communication with the On Prem DataCenter.

At 714, the toolkit makes decisions to establish VCN Peering Routes automatically based on y/n for "Configure VCNPeering Route".

At 716, the toolkit makes decisions to establish Transit Routes to allow spoke VCN subnets to communicate with OnPrem via Hub VCN.

At 718, the toolkit creates default security rules for each subnet for intra subnet and outgoing communication and attaches the default security list of the VCN to each subnet based on y/n in Subnets tab.

At 720, terraform tfvars are generated in the configured out directory by accumulating all the data from previous steps.

At 722, the out directory has already been configured to have Terraform Modules for each Toolkit supported resource during the setup of the toolkit. The out directory can also be configured for groups of each of the supported resources. In general, known spreadsheet to Terraform tools do generate Terraform modules. Further, the "tfvars" that call on those modules and generate independent terraforrm state files for each of those grouped resources.

At 724, the Terraform commands are executed such as the terraform init, plan and apply against the out directory.

Figure 8:
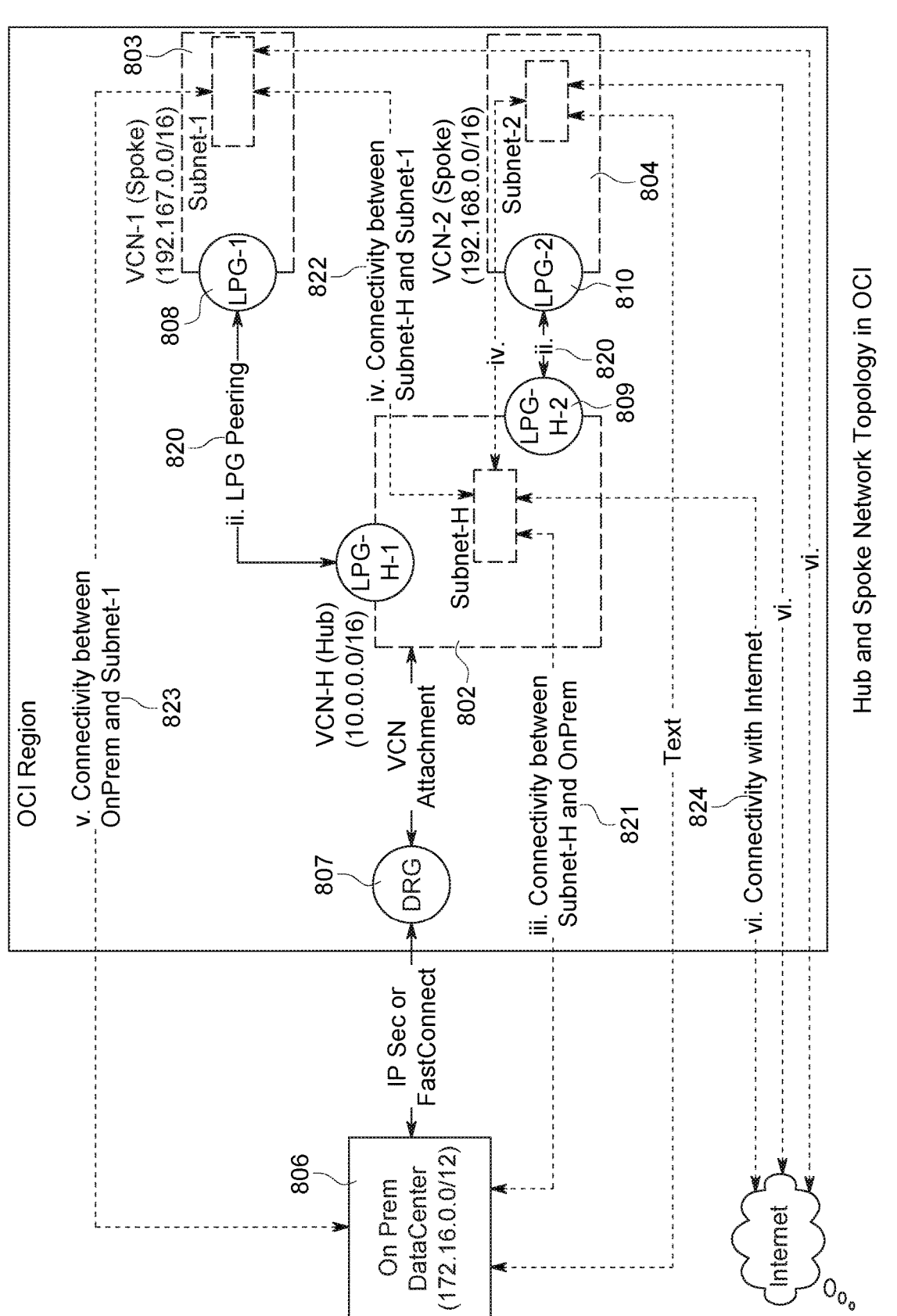
FIG. 8 is a block diagram illustrating a hub and spoke network topology of OCI that can be provisioned using the system in accordance to embodiments of the invention.

FIG. 8 is a block diagram illustrating a hub and spoke network topology of OCI that can be provisioned using system 10 in accordance to embodiments of the invention. FIG. 8 illustrates the target state of the client's OCI tenancy. It shows three VCNs—VCN-H (802), VCN-1 (803) and VCN-2 (804). VCN-H is connected to the OnPrem Data-Center 806 via DRG 807. VCN-1 and VCN-2 are connected to VCN-H via LPGs 808-810.

The hub and spoke network topology of FIG. 8 is used to achieve connectivity from on-premises to VCNs inside of OCI. This connectivity is depicted as "Spoke: VCN-H" where VCN-H is the Hub VCN. This in-turn creates the required route table entries across the LPG Route Tables and DRG and the LPG Peering artifacts inside OCI for the Spoke VCN. Route rules and their targets are abstracted with the use of "y" & "n" in the excel sheet which are then generated in the Terraform.

The toolkit 504 helps achieve the topology of FIG. 8 by auto-calculating multiple connectivity data points (disclosed below) based on information provided in CD3 Excel Sheet tabs.

For the VCN resources, toolkit 504 reads the tabs of the spreadsheet 502 (i.e., tabs corresponding to VCNs, DHCP and Subnets) and extracts data for generating terraform code for VCNs, their gateways—based on y/n for columns drg_required, igw_required, ngw_required, sgw_required in VCNs tab, Subnets, their security lists, route tables, DHCP, etc. Toolkit 504 also attaches the VCN-H to DRG and automatically creates a Route Table associated with DRG for that VCN. Dynamic Host Configuration Protocol ("DHCP") is a network management protocol used to automate the process of configuring devices on IP networks.

FIGS. 9A-9C illustrate several example tabs of spreadsheet 502 that can be used as input to system 10 in accordance to embodiments. FIG. 9A is an example of data fed into a "VCN" tab for peering VCNs (at 820 of FIG. 8) for communication via an LPG. Based on the column J in FIG. 9A, toolkit 504 creates a mapping of all the spoke VCNs for the Hub VCN in the following format:

$$VCN-H = VCN-1, VCN-2$$

It also creates a mapping of CIDR blocks and LPGs of the peered VCNs (at 821 of FIG. 8). It then iterates over this map and establishes LPG Peering between LPGs of Hub VCN and each of the Spoke VCN. It uses this same map to create route rules also automatically as disclosed below.

FIG. 9B is an example of data fed into a "Subnets" tab for connectivity between resources in Subnet-H and resources on OnPrem—Subnet. FIG. 9C is an example of data fed into a "VCN Info" tab for connectivity between resources in Subnet-H and resources on OnPrem—Subnet.

In response to the input from FIGS. 9A-9C, in embodiments toolkit 504 creates the below route rule automatically for Subnet-H-RT:

| Destination CIDR | Route Target |
|---|---|
| 172.16.0.0/12 | DRG |

FIG. 10 illustrate an example tab of spreadsheet 502 that can be used as input to system 10 in accordance to embodiments. FIG. 10 is an example of data fed into a "Subnets" tab for connectivity between resources in Subnet-H and resources in Subnet-1—Inter VCN communication via VCN Peering Routes (see Column P) (at 822 of FIG. 8).

In response to the input from FIG. 10 and the VCN CIDR blocks, in embodiments toolkit 504 creates the below route rule automatically to Subnet-H-RT:

| Destination CIDR | Route Target |
|---|---|
| 192.167.0.0/16 | LPG-H-1 | and the below route rule to Subnet-1-RT:

| Destination CIDR | Route Target |
|---|---|
| 10.0.0.0/16 | LPG-1 |

In another example, for connectivity between resources in Subnet-1 and resources OnPrem—Transit Routes (at 823 of FIG. 8), Transit Routing allows resources in VCN-1 to communicate with resources OnPrem without having direct connectivity between them. The routes are established in such a way that the communication happens via the Hub VCN. Based on data in VCNs and VCN Info tabs (FIGS. 9B and 9C, respectively), toolkit 504 in embodiments adds the below route rules to Subnet-1-RT:

| Destination CIDR | Route Target |
|---|---|
| 172.16.0.0/12 | LPG-1 |

Further, the below route tables with mentioned rules are calculated by the tooling and created:

| Route Table Associated with DRG: | |
|---|---|
| Destination CIDR | Route Target |
| 192.167.0.0/16 | LPG-H-1 |

| Route Table Associated with LPG-H-1: | |
|---|---|
| Destination CIDR | Route Target |
| 172.16.0.0/12 | DRG |

In another example, for connectivity resources in Subnet-H and Internet (at 824 of FIG. 8), the internet destination is specified in the VCN Info tab of FIG. 9B and FIG. 9C. Connectivity to Oracle internal services is also configured via column L of FIG. 9B (the route rule not shown).

In response, as output, toolkit 504 creates the below route rule automatically for Subnet-1-RT:

| Destination CIDR | Route Target |
|---|---|
| 0.0.0.0/0 | IGW | and the below route rule to Subnet-2-RT:

| Destination CIDR | Route Target |
|---|---|
| 0.0.0.0/0 | NGW |

In addition to the above tasks, toolkit 504 in embodiments also validates the data in the excel sheet for any typos, conflicting CIDR blocks, etc., as well as automatically adding, for the security list for each subnet, security rules for intra subnet and outgoing communication. Toolkit 504 adds the rules for each subnet based on its CIDR block.

Figure 11:
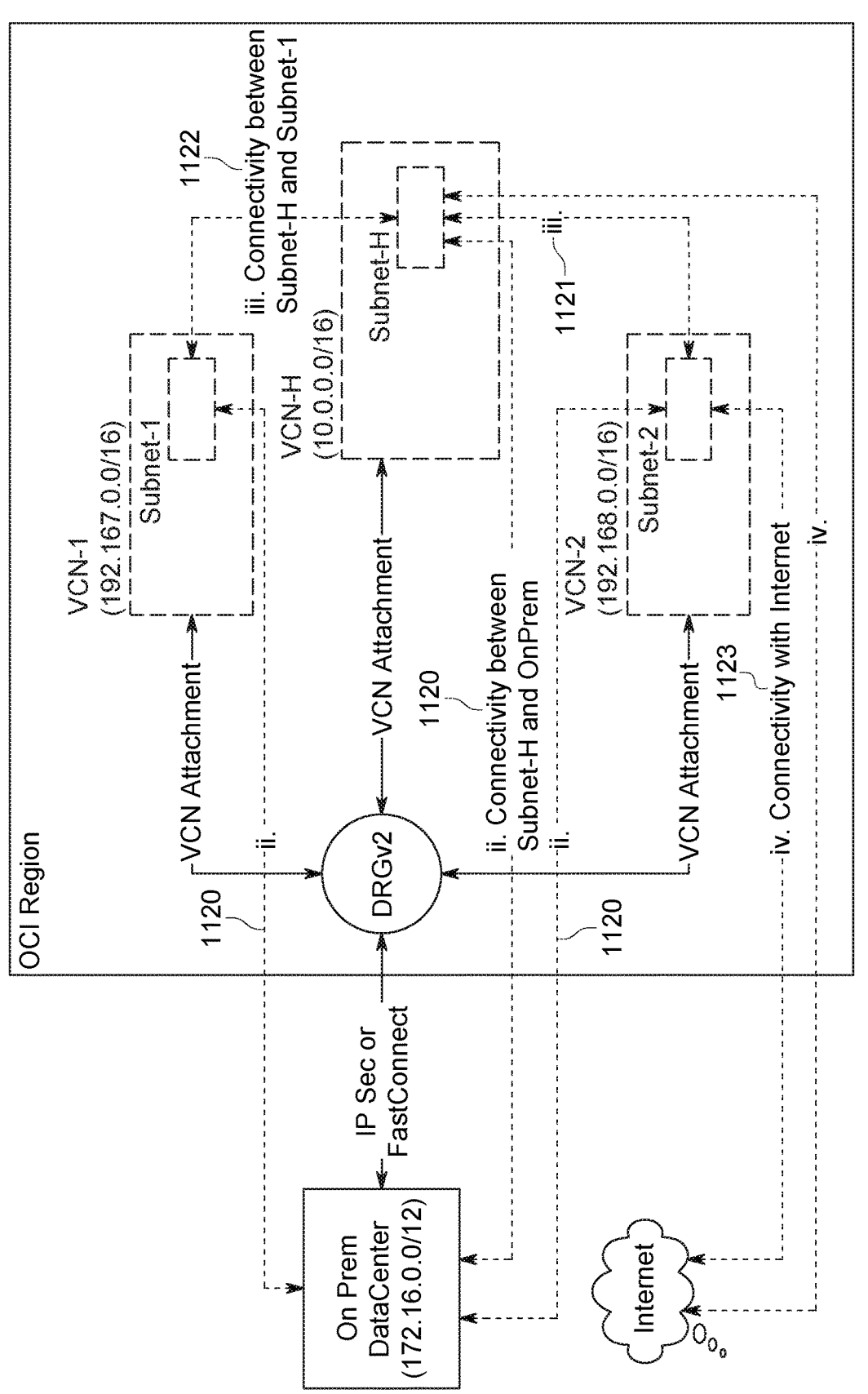
FIG. 11 is a block diagram illustrating a DRGv2 network topology of OCI that can be provisioned using the system in accordance to embodiments of the invention.

FIG. 11 is a block diagram illustrating a DRGv2 network topology of OCI that can be provisioned using system 10 in accordance to embodiments of the invention.

FIG. 11 represents the target state of the client's OCI tenancy using DRGv2 where all the VCNs (VCN-H, VCN-1, and VCN-2) are connected to a single DRG and the DRG is connected to an OnPrem DataCenter. System 10 helps achieve the topology of FIG. 11 by auto-calculating multiple connectivity data points (disclosed below) based on information provided in CD3 Excel Sheet tabs.

In embodiments, system 10/toolkit 504 makes the following unique decisions to create the FIG. 11 architecture:

Connectivity from on-Premises to Cloud is achieved via the DRG. The route entries into DRG are automatically made by simply reading the "on_prem_destinations" field.

Resources for the DRG Route Table, VCN Attachments and VCN Route tables are all calculated within system 10 and created without user intervention based on the VCN Attachment.

Route rules are also calculated based on the VCNs, Subnets & the appropriate "on_prem_destination" without user intervention and added to the appropriate route tables of the VCN Subnet Route Table & the DRG Route Table. This enables the connectivity between the VCNs and the DRG (which will allow the on-prem connection or other DRG connections as well).

FIGS. 12A-12C illustrate several example tabs of spreadsheet 502 that can be used as input to system 10 in accordance to embodiments. FIGS. 12A-12C is an example of toolkit 502 reading the tabs—VCNs, DHCP and Subnets, respectively, and extracts data for generating terraform code for VCN resources—VCNs, their gateways—based on y/n for columns drg_required, igw_required, ngw_required, sgw_required in VCNs tab, Subnets, their security lists, route tables, DHCP etc. Toolkit 502 also attaches 3 VCNs—VCN-1, VCN-2, VCN-H to DRG and automatically creates a Route Table associated with DRG for each VCN.

For connectivity between resources in Subnet-H and resources on OnPrem—Subnet Routes (at 1120 of FIG. 11), toolkit 502 receives data fed to the "Subnets" tab of FIG. 12B and the "VCN Info" tab of FIG. 12C.

In response to the input from FIGS. 12A-12C, in embodiments toolkit 504 creates the below route rule automatically for Subnet-H-RT:

| Destination CIDR | Route Target |
|---|---|
| 172.16.0.0/12 | DRGv2 |

For connectivity between resources in Subnet-H and resources in Subnet-1—Inter VCN Communication (at 1121 of FIG. 11), which happens via DRGv2 and the route tables associated with VCN attachments, toolkit 504 adds the below rules to the subnet-H-RT:

| Destination CIDR | Route Target |
|---|---|
| 192.167.0.0/16 | DRGv2 |

FIGS. 13A-13C illustrate several example tabs of spreadsheet 502 that can be used as input to system 10 in accordance to embodiments. The below rules are added to DRG Route Table for each VCN attachment (at 1122 of FIG.

11) based on the data of FIG. 13A fed in CD3. These route rules are added dynamically based on the route distribution statements disclosed.

| Destination CIDR | Route Target |
|---|---|
| 192.167.0.0/16 | VCN Attachment for VCN-1 |
| 192.168.0.0/16 | VCN Attachment for VCN-2 |
| 10.0.0.0/16 | VCN Attachment for VCN-H |

For connectivity between resources in Subnet-H and Internet—Subnet Routes (at 1123 of FIG. 11), toolkit 502 receives data fed to the "Subnets" tab of FIG. 13B and the "VCN Info" tab of FIG. 13C.

In response to the input from FIGS. 13B-13C, in embodiments toolkit 504 creates the below route rule automatically for Subnet-1-RT:

| Destination CIDR | Route Target |
|---|---|
| 0.0.0.0/0 | IGW | and the below route rule to Subnet-2-RT:

| Destination CIDR | Route Target |
|---|---|
| 0.0.0.0/0 | NGW |

Figure 14:
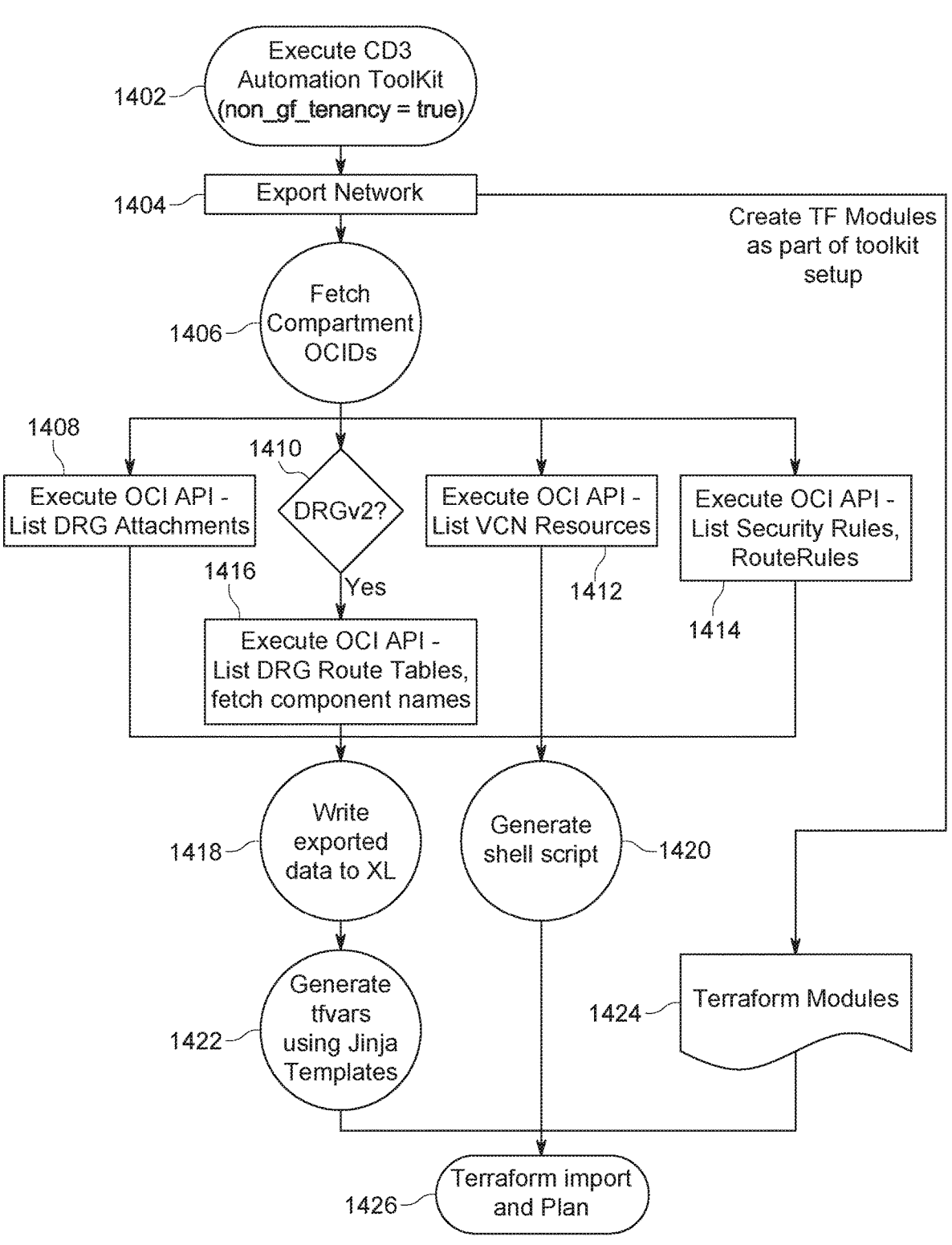
FIG. 14 is a flow diagram of the functionality of the automated resource provisioning module of FIG. 2 when provisioning cloud resources in accordance to one embodiment.

FIG. 14 is a flow diagram of the functionality of automated resource provisioning module 16 of FIG. 2 when provisioning cloud resources in accordance to one embodiment. FIG. 14 provides details on the Non-Greenfield workflow shown in FIG. 6 for generating excel spreadsheets with tabs corresponding to resources as provisioned on OCI.

The functionality of FIG. 14 begins using as input the provisioned OCI (or other type of cloud infrastructure) and system 10/toolkit 602 is executed at 1402 and the "Export Network" option (or another service shown in Table 1, such as IAM/identity, Storage, Compute, etc.) is chosen at 1404. Information regarding each of the provisioned components corresponding to the chosen service is then retrieved and placed/populated in a separate spreadsheet tab.

At 1406, toolkit 602 fetches the compartment information from OCI tenancy and puts the OCIDs into variables file of each region.

At 1408, toolkit 602 executes OCI APIs to fetch DRG attachments from the OCI Console.

At 1410 and 1416, based on the DRG version retrieved from the attachment at 1408, for DRGv2, it calls the API for fetching VCN attachments and DRG Route Tables. It also stores the names for Route Tables associated with DRG for each VCN, names of DRG attachments, etc., in output files and uses them to create the final terraform output. This is done to export the data as is from OCI Tenancy.

At 1412, toolkit 602 proceeds to execute APIs to fetch VCN resource objects: Gateways, Subnets, DHCP, etc.

At 1414, toolkit 602 calls the respective APIs to fetch data about Security Lists and Route Tables.

At 1418, all of the exported data is written to a excel file by populating the respective spreadsheet tab.

At 1420, toolkit 602 also generates a shell script containing terraform import commands for each resource, which will create the tfstate file. This is the core file that allows terraform to keep track of the OCI resources that it needs to manage.

Once the export to the excel file is complete at 1418, toolkit 602 creates the terraform output ("tfvars") for all the exported resources using same the procedure for Greenfield as disclosed above.

At 1424, the out directory has already been configured to have Terraform Modules for each Toolkit supported resource during the setup of the toolkit.

At 1426, once the export is complete, the end user will execute the Toolkit generated shell script to run terraform import commands to create the tfstate file which will enable terraform to manage the OCI resources. After the shell script completes the import, the end user should run terraform plan which should result in the output of "No Changes. Infrastructure is up to date". The same exported excel sheet can now be used to manage new resources by updating the required excel sheet tab and changing the workflow to Greenfield and using the functionality of FIG. 7.

For the functionality of FIG. 14, a tab corresponding to any of the corresponding components of the services of Table 1 can be generated and filled in or populated automatically. For example, if IAM/Identity components are chosen to be exported, embodiments will populate the respective spreadsheet tabs: Compartments, Groups, Policies, etc. in the excel sheet and not touch any other tab. For the export of Network components it will fill the data in—VCNs, DRGs, VCN Info, DHCP, Subnets, DRGRouteRulesinOCI, RouteRulesinOCI and SecRulesinOCI tabs of the excel sheet. For compute VMs, it will fill the data in the Instances sheet, and so on.

Example Cloud Infrastructure

FIGS. 15-18 illustrate an example cloud infrastructure that can incorporate network cloud 104 that can include the automated resource provisioning system 10 of FIG. 1 in accordance to embodiments.

As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM"s), install operating systems ("OS"s) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 15:
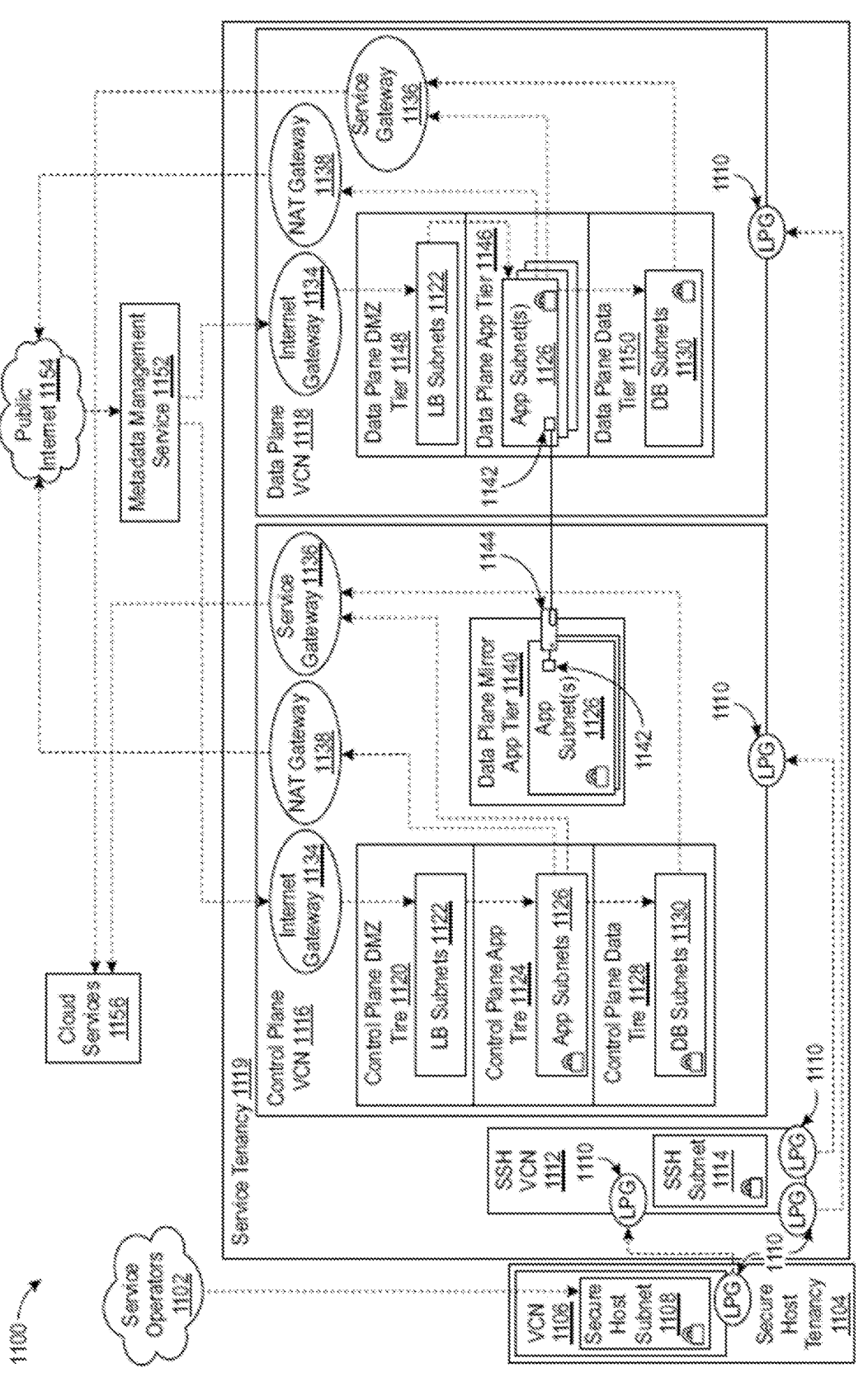
FIGS. 15-18 illustrate an example cloud infrastructure that can incorporate the network cloud that can include the automated resource provisioning system of FIG. 1 in accordance to embodiments.

FIG. 15 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 16:
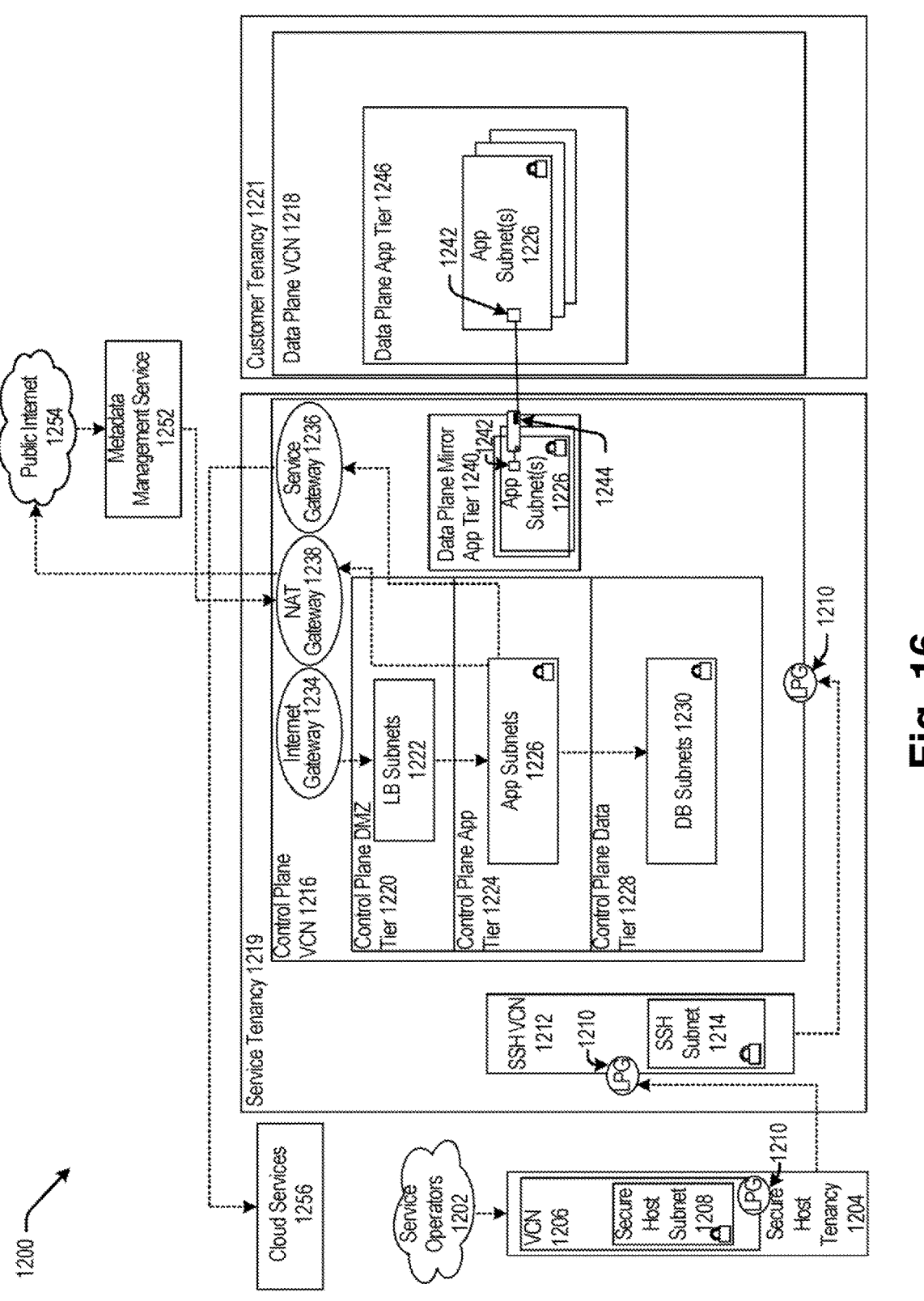

FIG. 16 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 17:
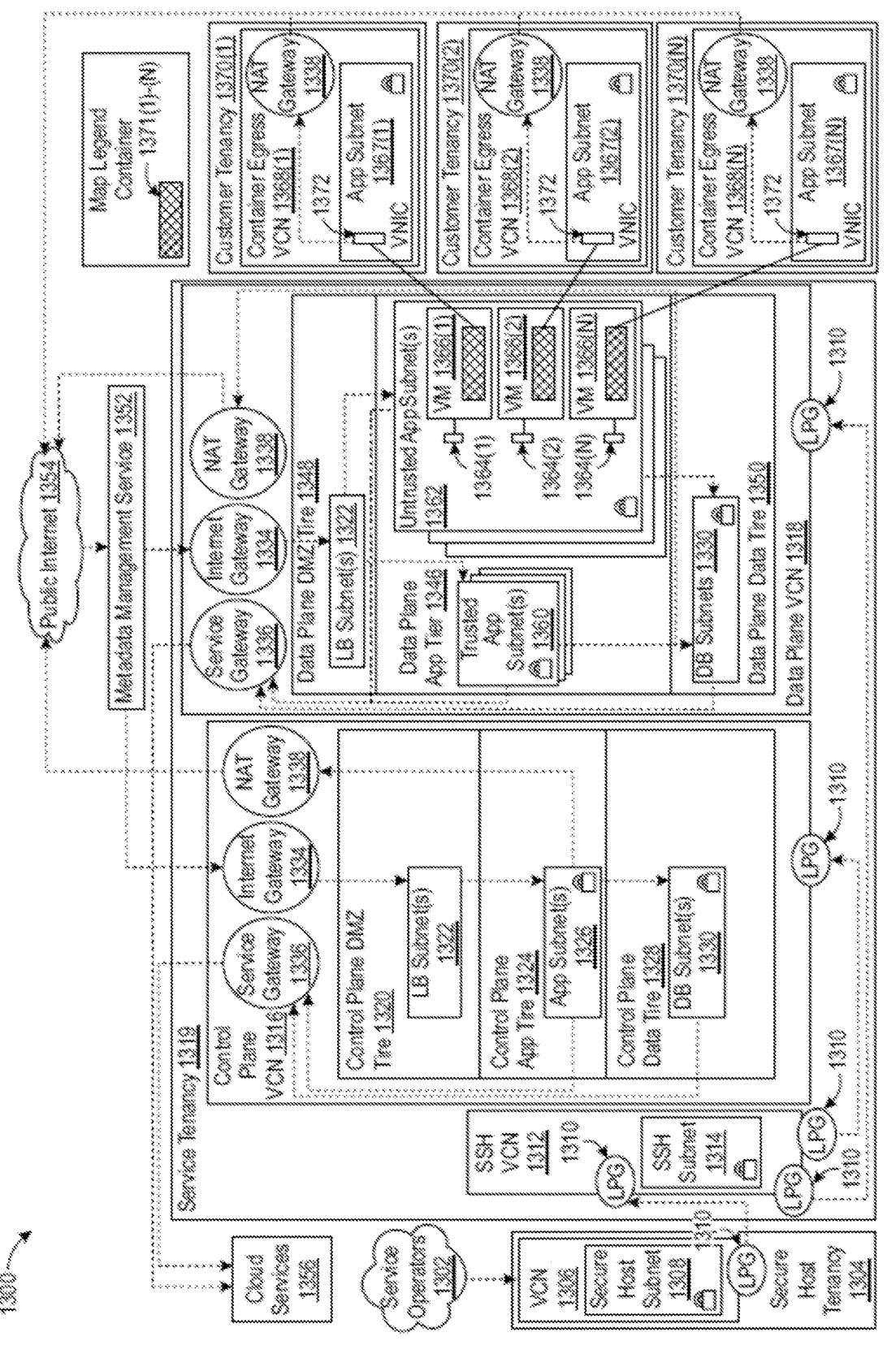

FIG. 17 is a block diagram 1300 illustrating another example pattern of an IaaS architecture, according to at least one embodiment. Service operators 1302 (e.g. service operators 1102) can be communicatively coupled to a secure host tenancy 1304 (e.g. the secure host tenancy 1104) that can include a virtual cloud network (VCN) 1306 (e.g. the VCN 1106) and a secure host subnet 1308 (e.g. the secure host subnet 1108). The VCN 1306 can include an LPG 1310 (e.g. the LPG 1110) that can be communicatively coupled to an SSH VCN 1312 (e.g. the SSH VCN 1112) via an LPG 1310 contained in the SSH VCN 1312. The SSH VCN 1312 can include an SSH subnet 1314 (e.g. the SSH subnet 1114), and the SSH VCN 1312 can be communicatively coupled to a control plane VCN 1316 (e.g. the control plane VCN 1116) via an LPG 1310 contained in the control plane VCN 1316 and to a data plane VCN 1318 (e.g. the data plane 1118) via an LPG 1310 contained in the data plane VCN 1318. The control plane VCN 1316 and the data plane VCN 1318 can be contained in a service tenancy 1319 (e.g. the service tenancy 1119).

The control plane VCN 1316 can include a control plane DMZ tier 1320 (e.g. the control plane DMZ tier 1120) that can include load balancer ("LB") subnet(s) 1322 (e.g. LB subnet(s) 1122), a control plane app tier 1324 (e.g. the control plane app tier 1124) that can include app subnet(s) 1326 (e.g. similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g. the service gateway) and a network address translation (NAT) gateway 1338 (e.g. the NAT gateway 1138). The control plane VCN 1316 can include the service gateway 1336 and the NAT gateway 1338.

The data plane VCN 1318 can include a data plane app tier 1346 (e.g. the data plane app tier 1146), a data plane DMZ tier 1348 (e.g. the data plane DMZ tier 1148), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 18:
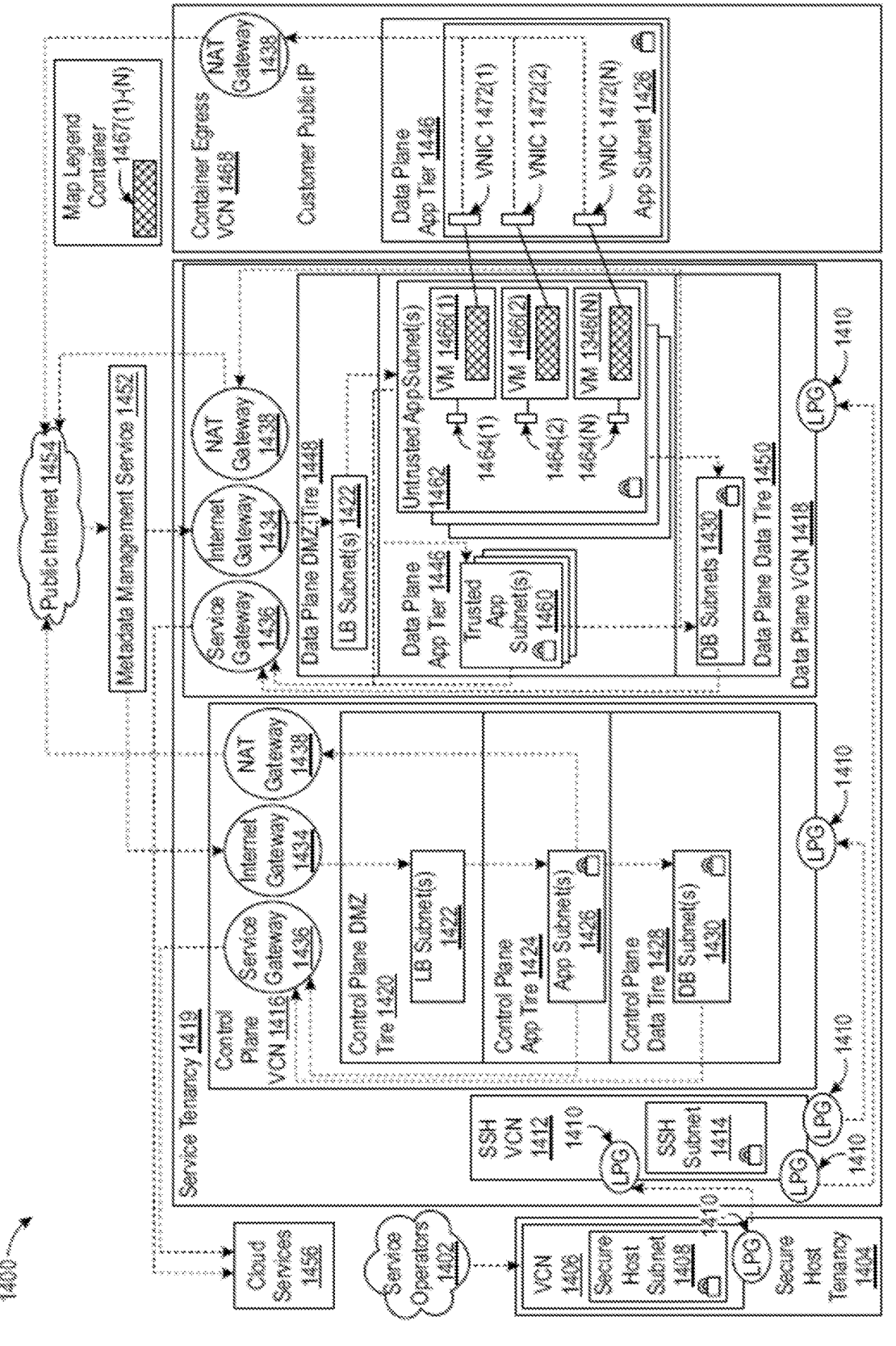

FIG. 18 is a block diagram 1400 illustrating another example pattern of an IaaS architecture, according to at least one embodiment. Service operators 1402 (e.g. service operators 1102) can be communicatively coupled to a secure host tenancy 1404 (e.g. the secure host tenancy 1104) that can include a virtual cloud network ("VCN") 1406 (e.g. the VCN 1106) and a secure host subnet 1408 (e.g. the secure host subnet 1108). The VCN 1406 can include an LPG 1410 (e.g. the LPG 1110) that can be communicatively coupled to an SSH VCN 1412 (e.g. the SSH VCN 1112) via an LPG 1410 contained in the SSH VCN 1412. The SSH VCN 1412 can include an SSH subnet 1414 (e.g. the SSH subnet 1114), and the SSH VCN 1412 can be communicatively coupled to a control plane VCN 1416 (e.g. the control plane VCN 1116) via an LPG 1410 contained in the control plane VCN 1416 and to a data plane VCN 1418 (e.g. the data plane 1118) via an LPG 1410 contained in the data plane VCN 1418. The control plane VCN 1416 and the data plane VCN 1418 can be contained in a service tenancy 1419 (e.g. the service tenancy 1119).

The control plane VCN 1416 can include a control plane DMZ tier 1420 (e.g. the control plane DMZ tier 1120) that can include LB subnet(s) 1422 (e.g. LB subnet(s) 1122), a control plane app tier 1424 (e.g. the control plane app tier 1124) that can include app subnet(s) 1426 (e.g. app subnet(s) 1126), a control plane data tier 1428 (e.g. the control plane data tier 1128) that can include DB subnet(s) 1430 (e.g. DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146), a data plane DMZ tier 1448 (e.g. the data plane DMZ tier 1148), and a data plane data tier 1450 (e.g. the data plane data tier 1150). The data plane DMZ tier 1448 can include LB subnet(s) 1422 that can be communicatively coupled to trusted app subnet(s) 1460 (e.g. trusted app subnet(s) 1360) and untrusted app subnet(s) 1462 (e.g. untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154).

The Internet gateway 1434 contained in the control plane VCN 1416 and contained in the data plane VCN 1418 can be communicatively coupled to a metadata management service 1452 (e.g. the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 18 may be considered an exception to the pattern illustrated by the architecture of block diagram 1300 of FIG. 17 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

Although embodiments disclosed above are generally described in terms of OCI components, including VCN, NGW, IGW and DRG, embodiments as claimed are not limited to OCI components. Embodiments that are implemented with other cloud infrastructures will use cloud components that provide the same or similar functionality but correspond to the other cloud infrastructures. For example, the below table provides general descriptions of cloud components/resources, and examples of such component from a selection of corresponding cloud infrastructures.

| Cloud Components | OCI Term | Azure Term | AWS Term |
|---|---|---|---|
| A Virtual private network resembling a traditional network that you'd operate in your own data center. | Virtual Cloud Network (VCN) | Virtual Network (vNet) | Virtual Private Cloud (VPC) |

-continued

| Cloud Components | OCI Term | Azure Term | AWS Term |
|---|---|---|---|
| Gateway for outbound connectivity from private subnet | Nat Gateway (NGW) | vNet NAT | Nat Gateway |
| Gateway for inbound connectivity for public subnet | Internet Gateway (IGW) | vNet NAT with Azure Firewall to restrict access | Internet Gateway |
| Gateway to connect cloud network with on prem via VPN tunnel or dedicated circuit (Cross premises Connectivity) | Dynamic Routing Gateway (DRG) | VPN Gateway | Transit Gateway |

As disclosed, embodiments are directed to a Cloud Deployment Design Deliverable tool that automates provisioning of resources in the OCI as well as other cloud infrastructures. The tool accepts an Excel spreadsheet file (.XLS) as the input which lists out the objects to be created in OCI. The Excel spreadsheet includes different tabs (e.g., Compartments, Groups, Policies, VCNs) corresponding to the objects with exact naming and other properties which are read by the tool and automatically generate output Terraform files. The Terraform files can then be used to provision the resources in OCI. The process can also work in reverse where a cloud infrastructure can be read and converted to a spreadsheet file and can be used to provision a different cloud infrastructure, such as Amazon AWS.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of provisioning cloud infrastructure services comprising a plurality of components for a first cloud infrastructure, the method comprising:

receiving a selection of a first service of the cloud infrastructure services, the first service comprising a plurality of first cloud infrastructure components;

via an application programming interface (API) corresponding to the cloud infrastructure, extracting configuration information for corresponding to each of the plurality of first cloud infrastructure components;

creating a spreadsheet corresponding to the first service, the spreadsheet comprising a separate spreadsheet tab corresponding to each of the first cloud infrastructure components;

populating each of the separate spreadsheet tabs with the extracted configuration information;

receiving revisions of the spreadsheet, the revisions comprising modifications to the extracted configuration information or a creation of new cloud infrastructure components, each new cloud infrastructure component comprising a new spreadsheet tab; and generating a new executable configuration file from the revised spreadsheet; and using the new executable configuration file to provision cloud resources on the cloud infrastructure corresponding to the revisions via the API.

2. The method of claim 1, wherein the new configuration file comprises an open source infrastructure as code tool.

3. The method of claim 1, wherein the first service is a network service, and the first components comprise a virtual private network, a gateway, a subnet, and a Dynamic Host Configuration Protocol.

4. The method of claim 1, further comprising using the new configuration file to provision cloud resources on a second cloud infrastructure that is different than the first cloud infrastructure.

5. The method of claim 3, wherein the virtual private network comprises a Virtual Cloud Network, and the gateway comprise a Nat Gateway an Internet Gateway or a Dynamic Routing Gateway.

6. The method claim 1, wherein the cloud infrastructure comprises a virtual network and Local Peering Gateway (LPG) based architecture, wherein a LPG is a component of the virtual network for routing traffic between locally peered virtual networks;

in response to the revisions and using the new executable configuration file, automatically creating a first LPG and corresponding routing rules between a first virtual network and a second virtual network and attaching a route table to the LPGs.

7. The method claim 1, wherein the cloud infrastructure comprises a virtual network and routing gateway based architecture, wherein a routing gateway comprises a path between the virtual network and an on-premises network in response to the revisions and using the new executable configuration file, automatically attaching a first routing gateway to a first virtual network and automatically creating a first route table associated with the first routing gateway.

8. A non-transitory computer-readable medium storing instructions which, when executed by at least one of a plurality of processors, cause the processors to provision cloud infrastructure services comprising a plurality of components for a first cloud infrastructure, the provisioning comprising:

receiving a selection of a first service of the cloud infrastructure services, the first service comprising a plurality of first cloud infrastructure components;

via an application programming interface (API) corresponding to the cloud infrastructure, extracting configuration information for corresponding to each of the plurality of first cloud infrastructure components;

creating a spreadsheet corresponding to the first service, the spreadsheet comprising a separate spreadsheet tab corresponding to each of the first cloud infrastructure components;

populating each of the separate spreadsheet tabs with the extracted configuration information;

receiving revisions of the spreadsheet, the revisions comprising modifications to the extracted configuration information or a creation of new cloud infrastructure components, each new cloud infrastructure component comprising a new spreadsheet tab; and generating a new executable configuration file from the revised spreadsheet; and using the new executable configuration file to provision cloud resources on the cloud infrastructure corresponding to the revisions via the API.

9. The computer-readable medium of claim 8, wherein the new configuration file comprises an open source infrastructure as code tool.

10. The computer-readable medium of claim 8, wherein the first service is a network service, and the first components comprise a virtual private network, a gateway, a subnet, and a Dynamic Host Configuration Protocol.

11. The computer-readable medium of claim 8, further comprising using the new configuration file to provision cloud resources on a second cloud infrastructure that is different than the first cloud infrastructure.

12. The computer-readable medium of claim 10, wherein the virtual private network comprises a Virtual Cloud Network, and the gateway comprise a Nat Gateway an Internet Gateway or a Dynamic Routing Gateway.

13. The computer-readable medium of claim 8, wherein the cloud infrastructure comprises a virtual network and Local Peering Gateway (LPG) based architecture, wherein a LPG is a component of the virtual network for routing traffic between locally peered virtual networks;

in response to the revisions and using the new executable configuration file, automatically creating a first LPG and corresponding routing rules between a first virtual network and a second virtual network and attaching a route table to the LPGs.

14. The computer-readable medium of claim 8, wherein the cloud infrastructure comprises a virtual network and routing gateway based architecture, wherein a routing gateway comprises a path between the virtual network and an on-premises network further comprising:

in response to the revisions and using the new executable configuration file, automatically attaching a first routing gateway to a first virtual network and automatically creating a first route table associated with the first routing gateway.

15. A multi-tenant cloud infrastructure system comprising:

a plurality of cloud infrastructure services comprising a plurality of components for a first cloud infrastructure for a plurality of user accounts; and one or more processors executing instructions for provisioning the cloud infrastructure services, the provisioning comprising:

receiving a selection of a first service of the cloud infrastructure services, the first service comprising a plurality of first cloud infrastructure components;

via an application programming interface (API) corresponding to the cloud infrastructure, extracting configuration information corresponding to each of the plurality of first cloud infrastructure components;

creating a spreadsheet corresponding to the first service, the spreadsheet comprising a separate spreadsheet tab corresponding to each of the first cloud infrastructure components;

populating each of the separate spreadsheet tabs with the extracted configuration information;

receiving revisions of the spreadsheet, the revisions comprising modifications to the extracted configuration information or a creation of new cloud infrastructure components, each new cloud infrastructure component comprising a new spreadsheet tab; and generating a new executable configuration file from the revised spreadsheet; and using the new executable configuration file to provision cloud resources on the cloud infrastructure corresponding to the revisions via the API.

16. The system of claim 15, wherein the new configuration file comprises an open source infrastructure as code tool.

17. The system of claim 15, wherein the first service is a network service, and the first components comprise a virtual private network, a gateway, a subnet, and a Dynamic Host Configuration Protocol.

18. The system of claim 15, further comprising using the new configuration file to provision cloud resources on a second cloud infrastructure that is different than the first cloud infrastructure.

19. The system of claim 15, wherein the cloud infrastructure comprises a virtual network and Local Peering Gateway (LPG) based architecture, wherein a LPG is a component of the virtual network for routing traffic between locally peered virtual networks;

in response to the revisions and using the new executable configuration file, automatically creating a first LPG and corresponding routing rules between a first virtual network and a second virtual network and attaching a route table to the LPGs.

20. The system of claim 15, wherein the cloud infrastructure comprises a virtual network and routing gateway based architecture, wherein a routing gateway comprises a path between the virtual network and an on-premises network;

in response to the revisions and using the new executable configuration file, automatically attaching a first routing gateway to a first virtual network and automatically creating a first route table associated with the first routing gateway.

* * * * *